US010762619B2

(12) United States Patent
Nonaka

(10) Patent No.: US 10,762,619 B2
(45) Date of Patent: Sep. 1, 2020

(54) IMAGING SUPPORT DEVICE AND IMAGING SUPPORT METHOD

(71) Applicant: FUJIFILM Corporation, Tokyo (JP)

(72) Inventor: Shunichiro Nonaka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 139 days.

(21) Appl. No.: 16/015,333

(22) Filed: Jun. 22, 2018

(65) Prior Publication Data

US 2018/0322624 A1 Nov. 8, 2018

Related U.S. Application Data

(63) Continuation of application No. PCT/JP2017/000672, filed on Jan. 11, 2017.

(30) Foreign Application Priority Data

Jan. 26, 2016 (JP) .................. 2016-012539

(51) Int. Cl.
*G06T 7/00* (2017.01)
*G01N 21/01* (2006.01)
(Continued)

(52) U.S. Cl.
CPC .......... *G06T 7/0006* (2013.01); *G01N 21/01* (2013.01); *G01N 21/17* (2013.01); *G01N 21/88* (2013.01);
(Continued)

(58) Field of Classification Search
CPC ............. G06T 7/0006; G06T 7/0002; G06T 2207/10016; G01N 21/17; G01N 21/88;
(Continued)

(56) References Cited

U.S. PATENT DOCUMENTS

2010/0309308 A1    12/2010  Saphier et al.
2012/0019613 A1    1/2012   Murray et al.
(Continued)

FOREIGN PATENT DOCUMENTS

CN    203299134 U    11/2013
CN    105067630 A    11/2015
(Continued)

OTHER PUBLICATIONS

Barrientos et al., "Aerial Remote Sensing in Agriculture: A Practical Approach to Area Coverage and 3ath Planning for Fleets of Mini Aerial Robots", Sep. 9, 2011, vol. 28, No. 5, XP055240648, Journal of Field Robotics, pp. 668-689.*
(Continued)

*Primary Examiner* — James M Pontius
(74) *Attorney, Agent, or Firm* — Studebaker & Brackett PC

(57) ABSTRACT

An imaging support device (10) includes an imaging point specification unit (22) that specifies an imaging point of a structure on the basis of drawing information, an imaging planning unit (24) that generates imaging plan information including at least one of imaging position information or imaging range information of an imaging device at each imaging of the structure on the basis of the specified imaging point and image quality information, an actual imaging information-acquisition unit (28) that acquires actual imaging information including at least one of actual imaging position information or actual imaging range information of the imaging device at each imaging of the structure, and an imaging support information-generation unit (30) that combines the imaging plan information and the actual imaging information with the drawing information and allows a display unit (13) to display combined information.

20 Claims, 19 Drawing Sheets

(51) Int. Cl.
  *G01N 21/88* (2006.01)
  *G03B 15/00* (2006.01)
  *H04N 5/225* (2006.01)
  *G03B 17/18* (2006.01)
  *G03B 17/24* (2006.01)
  *G01N 21/17* (2006.01)
  *H04N 5/232* (2006.01)
  *H04N 5/265* (2006.01)
  *E01D 19/10* (2006.01)

(52) U.S. Cl.
  CPC ............. *G03B 15/00* (2013.01); *G03B 17/18* (2013.01); *G03B 17/24* (2013.01); *G06T 7/0002* (2013.01); *H04N 5/225* (2013.01); *H04N 5/2254* (2013.01); *H04N 5/2257* (2013.01); *H04N 5/23299* (2018.08); *H04N 5/265* (2013.01); *E01D 19/106* (2013.01); *G06T 2207/10016* (2013.01)

(58) Field of Classification Search
  CPC ........ G01N 21/01; G03B 17/24; G03B 17/18; G03B 15/00; H04N 5/225; H04N 5/265; H04N 5/2257; H04N 5/2254; H04N 5/23299; E01D 19/106
  See application file for complete search history.

(56) References Cited

U.S. PATENT DOCUMENTS

| | | |
|---|---|---|
| 2015/0317786 A1 | 11/2015 | Huang et al. |
| 2017/0169582 A1 | 6/2017 | Tanaka et al. |

FOREIGN PATENT DOCUMENTS

| | | | |
|---|---|---|---|
| JP | H10-269251 A | 10/1998 | |
| JP | 2002-073730 A | 3/2002 | |
| JP | 2004-318790 A | 11/2004 | |
| JP | 2005-260666 A | 9/2005 | |
| JP | 2007-280282 A | 10/2007 | |
| JP | 2015-225467 A | 12/2015 | |
| WO | 2015/163107 A1 | 10/2015 | |

OTHER PUBLICATIONS

International Search Report issued in PCT/JP2017/000672; dated Apr. 4, 2017.
International Preliminary Report on Patentability and Written Opinion issued in PCT/JP2017/000672; dated Jul. 31, 2018.
Antonio Barrientos et al.; "Aerial Remote Sensing in Agriculture: A Practical Approach to Area Coverage and Path Planning for Fleets of Mini Aerial Robots"; Journal of Field Robotics; Sep. 9, 2011; pp. 667-689; vol. 28, No. 5; XP055240648; USA; with a full text.
Ibrahim Demirel; "Aircraft pilot situational awareness interface for airborne operation of network controlled Unmanned Systems (US)"; Thesis; Mar. 1; 2008; pp. 1-118; XP055513100; California, USA; with a full text.
Steven J. Lorenc et al.; "Development of a robotic bridge maintenance system"; Automation in Construction; Elsevier; May 1, 2000; pp. 251-258; vol. 9, No. 3; XP004193538; Amsterdam, NL.
Communication pursuant to Article 94(3) EPC issued by the European Patent Office dated Jul. 15, 2019, which corresponds to European Patent Application No. 17 743 931.2-1210 and is related to U.S. Appl. No. 16/015,333.
The extended European search report issued by the European Patent Office dated Oct. 18, 2018, which corresponds to European Patent Application No. 17743931.2-1210 and is related to U.S. Appl. 16/015,333.
Antonio Barrientos et al., "Aerial Remote Sensing in Agriculture: A Practical Approach to Area Coverage and Path Planning for Fleets of Mini Aerial Robots", Sep. 9, 2011, 12 pages, vol. 28, No. 5, XP055240648, Journal of Field Robotics, USA.
Ibrahim Demirel, "Aircraft pilot situational awareness interface for airborne operation of network controlled Unmanned Systems (US)", Thesis, Mar. 1, 2008, 59 pages, XP055513100, California, USA.
An Office Action mailed by the State Intellectual Property Office of the People's Republic of China dated Jan. 22, 2020, which corresponds to Chinese Patent Application No. 201780005704.X and is related to U.S. Appl. No. 16/015,333 with English language translation.
An Office Action mailed by the European Patent Office dated Mar. 13, 2020, which corresponds to European Patent Application No. 17743931.2-1210 and is related to U.S. Appl. No. 16/015,331.

* cited by examiner

IMAGING SUPPORT DEVICE AND IMAGING SUPPORT METHOD

CROSS-REFERENCE TO RELATED APPLICATIONS

The present application is a Continuation of PCT International Application No. PCT/JP2017/000672 filed on Jan. 11, 2017 claiming priority under 35 U.S.C § 119(a) to Japanese Patent Application No. 2016-12539 filed on Jan. 26, 2016. Each of the above applications is hereby expressly incorporated by reference, in their entirety, into the present application.

BACKGROUND OF THE INVENTION

Field of the Invention

The present invention relates to an imaging support device and an imaging support method that support the imaging of a structure performed using an imaging device.

Description of the Related Art

There are various structures, such as a bridge, a road, a tunnel, a dam, and a building, as social infrastructure. Since damage is generated in these structures and the damage is predisposed to progress with the lapse of time, the structures need to be inspected at a predetermined frequency.

Further, various supporting technologies using a computer device are known.

JP2007-280282A discloses a technology that receives global positioning system (GPS) radio waves by a portable terminal to calculate the position information of the portable terminal and determines whether or not the position information of the portable terminal is present in a predetermined range to check whether or not structures positioned near the portable terminal are structures to be inspected.

JP1998-269251A (JP-H10-269251A) discloses a technology that combines the drawing of a region to be inspected with an inspection list for the inspection of a defect position of an object to be inspected and displays the drawing and the inspection list on the same screen.

JP2002-73730A discloses a technology that creates a three-dimensional image viewed at a position and a height and in a lens direction of an imaging device in a region to be inspected in a case in which the position, the height, and the lens direction of the imaging device in the region to be inspected are set, and displays the three-dimensional image and taken images together.

SUMMARY OF THE INVENTION

In a case in which a structure is subjected to split imaging a plurality of times, it is difficult to acquire a plurality of images, which satisfy required image quality, without omission.

In a case in which, for example, a person as a main subject is imaged for one photo while a structure merely serves as the background, there may be no problem even though the image quality of a portion of the structure as the background is low. However, the damage state of the structure cannot be appropriately recognized in a case in which the image quality of an imaging point where critical damage is likely to be generated does not satisfy required image quality in the imaging of the structure for inspection.

For example, since a crack having a narrow width (for example, 0.1 mm) needs to be capable of being recognized in the inspection of a crack of a concrete member, the crack needs to be imaged with high image quality so as to be sufficiently recognized. Even in the inspection of a crevice of a steel member, the crevice needs to be imaged with high image quality so as to be sufficiently recognized. In a case where it is found that an image is taken with low image quality not allowing damage, such as a crack and a crevice, to be sufficiently recognized, an image needs to be taken again. Further, in a case where it is ignored that an image has been taken with low image quality not allowing damage to be sufficiently recognized, there is a possibility that inappropriate inspection results may be reported. For example, there are a possibility that a crack, which is narrow but critical, may be ignored and a possibility that a large crack may be evaluated as a narrow crack.

Since the technology disclosed in JP2007-280282A merely checks whether or not structures positioned near the portable terminal are structures to be inspected on the basis of the position information of the portable terminal obtained using GPS, it is difficult to acquire a plurality of images, which satisfy required image quality, without omission in the case of split imaging although the images of a structure to be inspected can be obtained.

Since the inspection list is merely combined with the drawing of the region to be inspected in the technology disclosed in JP1998-269251A (JP-H10-269251A), it is difficult to acquire a plurality of images, which satisfy required image quality, without omission in the case of split imaging.

Since a three-dimensional image viewed at a position and a height and in a lens direction of the imaging device is created and is merely displayed together with taken images in the technology disclosed in JP2002-73730A, it is difficult to acquire a plurality of images, which satisfy required image quality, without omission in the case of split imaging.

Further, there is a case where the split imaging of a structure is performed without being limited to inspection as a purpose. For example, there is a case where the split imaging of a structure is performed to create certain design information of main parts of a structure. A plurality of images, which satisfy required image quality, need to be capable of being acquired without omission even in split imaging other than split imaging for inspection as a purpose.

The invention has been made in consideration of the above-mentioned circumstances, and an object of the invention is to provide an imaging support device and an imaging support method that allow images, which satisfy required image quality, to be taken without omission in a case in which a structure is subjected to split imaging by an imaging device.

In order to achieve the above-mentioned object, an imaging support device according to a first aspect of the invention supports imaging of a structure performed using an imaging device, and comprises a drawing information-acquisition unit that acquires drawing information of the structure, an imaging point specification unit that specifies an imaging point of the structure on the basis of the drawing information, and an image quality information-acquisition unit that acquires image quality information of a taken image, an imaging planning unit that generates imaging plan information including at least one of imaging position information or imaging range information of the imaging device at each imaging of the structure on the basis of the specified imaging point and the image quality information, an actual imaging information-acquisition unit that acquires actual imaging information including at least one of actual imaging position information or actual imaging range information of the imaging device at each imaging of the structure, and an imaging support information-generation unit that combines the imaging plan information and the actual imaging information with the drawing information and allows a display device to display combined information.

According to this aspect, the imaging point of the structure is specified on the basis of the drawing information, the imaging plan information including at least one of the imaging position information or the imaging range information of the imaging device at each imaging of the structure is generated on the basis of the specified imaging point and the image quality information, the actual imaging information including at least one of actual imaging position information or actual imaging range information of the imaging device at each imaging of the structure is acquired, and the imaging plan information and the actual imaging information are combined with the drawing information and the combined information is displayed on the display device. Accordingly, it is possible to easily and appropriately check whether or not a taken image satisfies required image quality and split imaging is performed at each imaging. That is, images, which satisfy required image quality, can be acquired without omission in a case in which the structure is subjected to split imaging by the imaging device.

In an imaging support device according to a second aspect of the invention, the imaging device includes an imaging element and an imaging lens. The imaging support device according to the second aspect further comprises an imaging performance information-acquisition unit that acquires imaging performance information including information on the number of pixels of the imaging element of the imaging device, size information of the imaging element of the imaging device, and information on a focal length of the imaging lens. The imaging planning unit generates the imaging plan information, which satisfies image quality required for the taken image, on the basis of the imaging performance information and the image quality information. According to this aspect, imaging plan information, which satisfies image quality required for a taken image, is created on the basis of the information on the number of pixels of the imaging element, the size information of the imaging element, the information on a focal length of the imaging lens, and the image quality information. Accordingly, even in a case in which an imaging device of which at least one of the number of pixels of an imaging element, the size of the imaging element, or the focal length of an imaging lens is different is used for the same type of structure, images, which satisfy required image quality, can be acquired without omission.

In an imaging support device according to a third aspect of the invention, the imaging performance information includes information on at least one of a contrast, a focus, a blur, a shake, an angle of view, noise, a compression rate, white balance, or a shutter speed. According to this aspect, even in a case in which an imaging device of which at least one of a contrast, a focus, a blur, a shake, the angle of view, noise, a compression rate, white balance, or a shutter speed is different is used for the same type of structure, images, which satisfy required image quality, can be acquired without omission.

In an imaging support device according to a fourth aspect of the invention, the imaging support information-generation unit combines an image, which is taken by the imaging device, with the drawing information. According to this aspect, easy and appropriate checking can be performed using the image combined with the drawing information.

An imaging support device according to a fifth aspect of the invention further comprises an imaging range-determination unit that determines whether or not the taken image and another taken image overlap each other by a certain width or more. According to this aspect, even though the imaging position of the imaging plan information and the actual imaging position are different from each other, the entire image having required image quality can be easily created since a plurality of taken images including overlapping portions having a certain width or more are combined.

In an imaging support device according to a sixth aspect of the invention, the imaging range-determination unit determines whether or not the taken image and another taken image overlap each other on the basis of the actual imaging range information of the taken image having been taken and the imaging range information of another taken image not yet taken. In this aspect, the imaging plan information includes the imaging range information and the actual imaging information includes actual imaging range information.

In an imaging support device according to a seventh aspect of the invention, the imaging support information-generation unit allows the display device to display a warning in a case in which the imaging range-determination unit determines that the taken image and another taken image do not overlap each other by the certain width or more. That is, warning is displayed in a case in which overlap has a certain width or less or is not present.

In an imaging support device according to an eighth aspect of the invention, the imaging support information-generation unit allows the display device to display the imaging position information and the actual imaging position information at each imaging of the structure. In this aspect, the imaging plan information includes the imaging position information and the actual imaging information includes the actual imaging position information.

In an imaging support device according to a ninth aspect of the invention, the actual imaging information-acquisition unit acquires the actual imaging position information through communication with a reference device of which an absolute position is known.

In an imaging support device according to a tenth aspect of the invention, the actual imaging information-acquisition unit acquires an absolute position of the imaging device at one point of time, acquires a relative position of the imaging device at another point of time relative to the absolute position of the imaging device at one point of time, and acquires the actual imaging position information on the basis of the absolute position and the relative position of the imaging device.

An imaging support device according to an eleventh aspect of the invention further comprises a moving range information-acquisition unit that acquires moving range information representing a range where the imaging device is capable of being moved or a range where the imaging device is not capable of being moved, and the imaging planning unit generates the imaging plan information, which allows the imaging device to be moved in the range where the imaging device is capable of being moved, on the basis of the moving range information.

In an imaging support device according to a twelfth aspect of the invention, the imaging planning unit generates the imaging plan information that represents a permutation of imaging positions in the range where the imaging device is capable of being moved, and the imaging support information-generation unit allows the display device to display the permutation of the imaging positions.

In an imaging support device according to a thirteenth aspect of the invention, the imaging planning unit acquires imaging direction information of the imaging device at each imaging of the structure, and generates the imaging plan information that includes the imaging direction information.

An imaging support device according to a fourteenth aspect of the invention further comprises an imaging completion-determination unit that determines whether or not imaging of the imaging point is completed, and the imaging support information-generation unit allows the display device to display imaging completion information in a case in which it is determined that the imaging is completed.

In an imaging support device according to a fifteenth aspect of the invention, the imaging support information-generation unit allows the display device to display imaging incompletion information in a case in which it is determined that incomplete imaging of the imaging point is present and a distance between the imaging position subjected to the incomplete imaging and the imaging device exceeds a threshold value. In this aspect, the imaging plan information includes the imaging position information.

An imaging support device according to a sixteenth aspect of the invention further comprises an instruction input unit that receives an instruction to be input, and the imaging support information-generation unit allows the display device to display imaging incompletion information in a case in which it is determined that incomplete imaging of the imaging point is present and an instruction to stop at least one of the imaging device or the imaging support device is input.

An imaging support device according to a seventeenth aspect of the invention further comprises an imaging point-related information-acquisition unit that acquires at least one of information representing the type of a member of the structure, information representing the type of damage to the structure, or information representing the type of a configuration of the structure. The imaging point specification unit specifies the imaging point by analyzing the drawing information on the basis of at least one of the information representing the type of the member, the information representing the type of the damage, or the information representing the type of the configuration.

In an imaging support device according to an eighteenth second aspect of the invention, in a case in which the type of the member is a concrete member, the imaging point specification unit specifies the entire exposed surface of the concrete member as the imaging point.

In an imaging support device according to a nineteenth aspect of the invention, in a case in which the type of the member is a steel member, the imaging point specification unit specifies a portion of the steel member to which stress is applied as the imaging point.

An imaging support method of the invention supports imaging of a structure performed using an imaging device, and comprises a step of acquiring drawing information of the structure, a step of specifying an imaging point of the structure on the basis of the drawing information, a step of acquiring image quality information of a taken image, a step of generating imaging plan information, which includes at least one of imaging position information or imaging range information of the imaging device at each imaging of the structure, on the basis of the specified imaging point and the image quality information, a step of acquiring actual imaging information including at least one of actual imaging position information or actual imaging range information of the imaging device at each imaging of the structure, and a step of combining the imaging plan information and the actual imaging information with the drawing information and generating imaging support information allowing a display device to display combined information.

According to the invention, images, which satisfy required image quality, can be taken without omission in a case in which a structure is subjected to split imaging by an imaging device.

DESCRIPTION OF THE PREFERRED EMBODIMENTS

Embodiments of an imaging support device and an imaging support method according to the invention will be described below with reference to accompanying drawings.

Example of Structure

Figure 1:
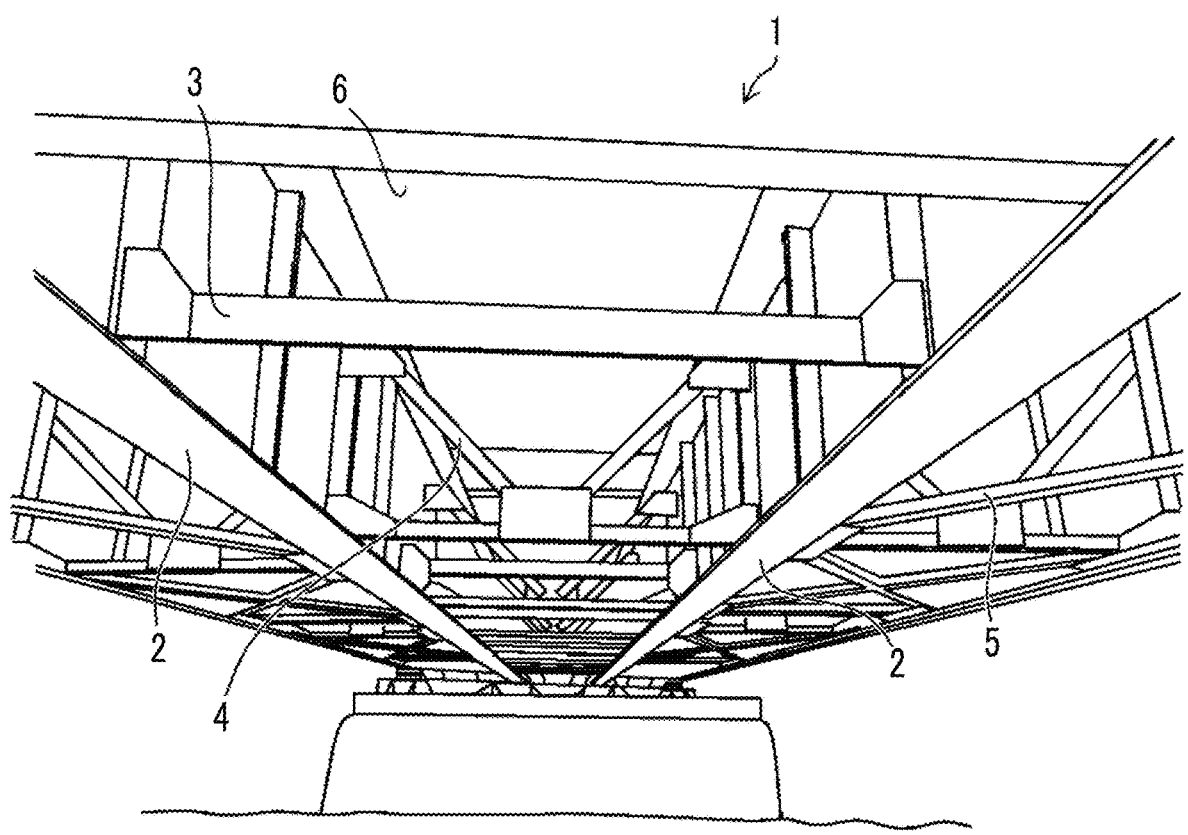
FIG. 1 is a diagram showing the appearance of a bridge that is an example of a structure.

FIG. 1 is a diagram showing the appearance of a bridge that is an example of a structure, and is a perspective view of the bridge seen from below.

The bridge 1 shown in FIG. 1 includes main girders 2, cross beams 3, cross frames 4, and lateral frames 5; and the main girders 2, the cross beams 3, the cross frames 4, and the lateral frames 5 are connected to each other by bolts, rivets, or welding. Further, deck slabs 6 on which vehicles and the like travel are installed on the main girders 2 and the like. The deck slab 6 is generally formed of a concrete member.

The main girder 2 is a member that is provided between abutments or piers and supports the load of vehicles and the like present on the deck slab 6. The cross beams 3 are members connecting the main girders 2 so that a load is supported by the plurality of main girders 2. The cross frame 4 and the lateral frame 5 are members that connect the main girders 2 to resist the lateral load of wind and earthquake.

The "structure" of the invention is not limited to a bridge. For example, the "structure" of the invention may be a road, a tunnel, a dam, and a building.

Example of Imaging Device and Example of Mounting of Imaging Device

Figure 2:
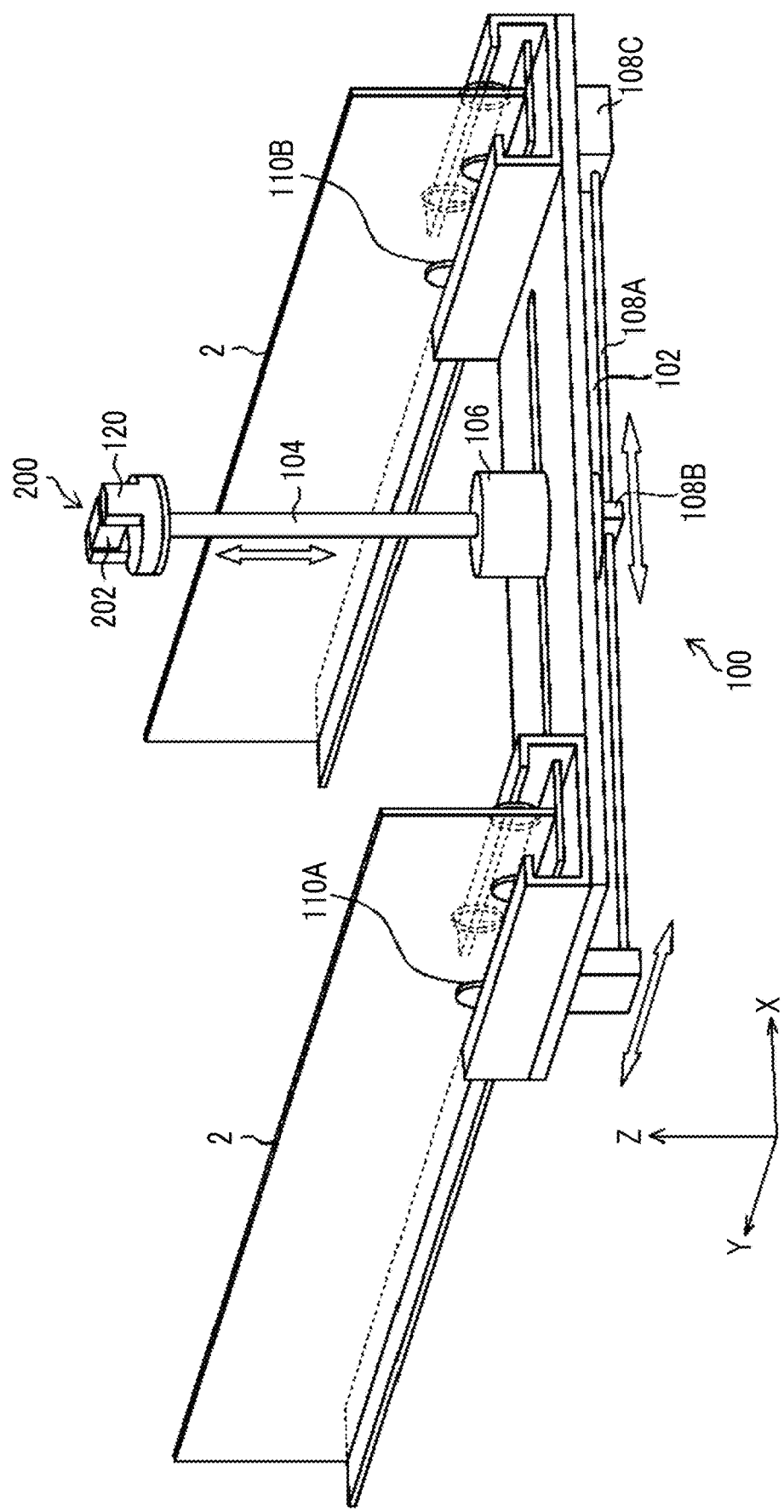
FIG. 2 is a perspective view showing the appearance of a robot apparatus including an imaging device.
Figure 3:
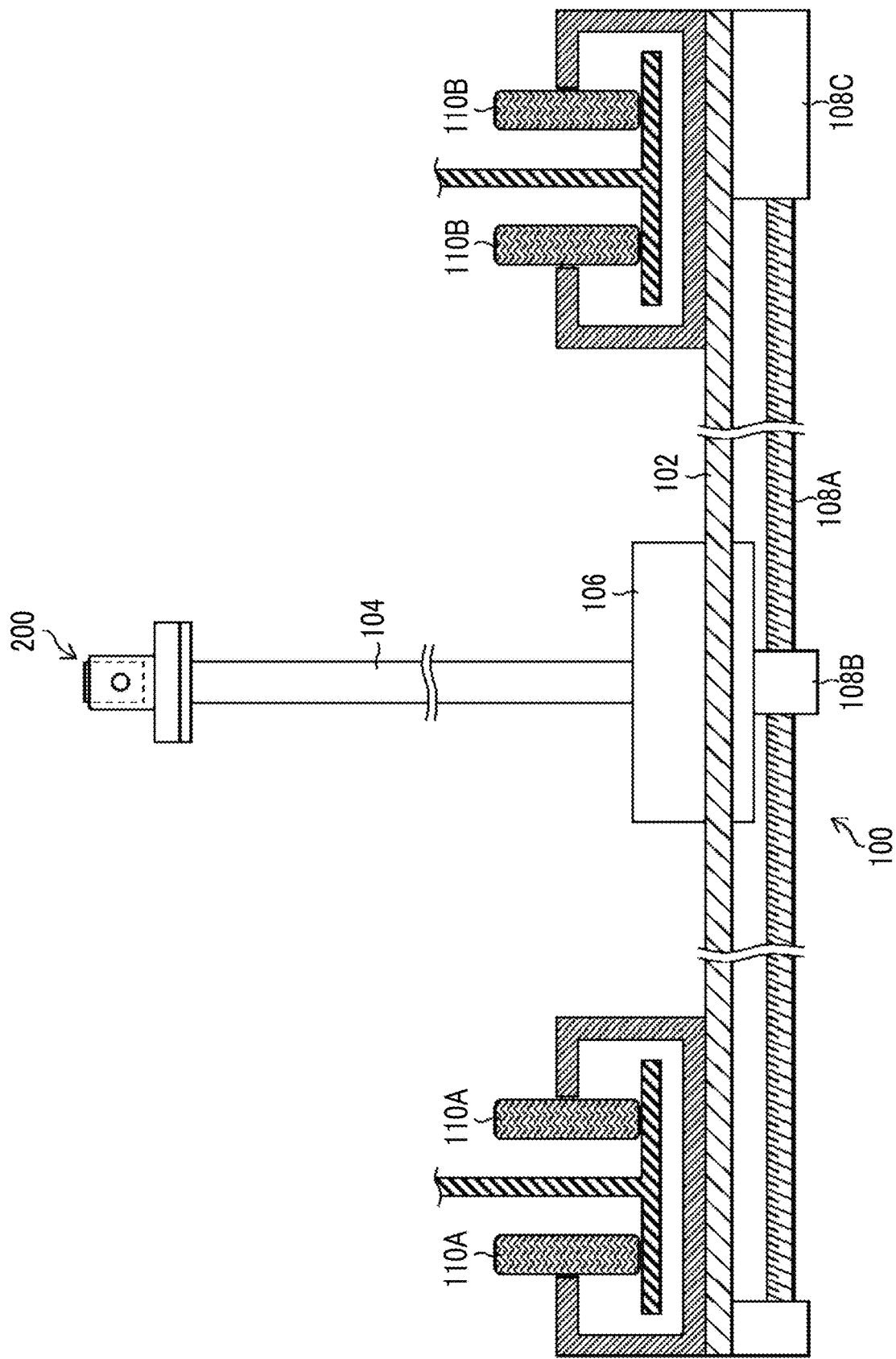
FIG. 3 is a cross-sectional view of main parts of the robot apparatus shown in FIG. 2.

FIG. 2 is a perspective view showing the appearance of a robot apparatus 100 including the imaging device 200, and shows a state in which the robot apparatus 100 is installed between the main girders 2 of the bridge 1. Further, FIG. 3 is a cross-sectional view of main parts of the robot apparatus shown in FIG. 2.

The robot apparatus 100 includes the imaging device 200, and controls the position (which is an actual imaging position) of the imaging device 200 in a three-dimensional space and controls the imaging direction (which is an actual imaging direction) of the imaging device 200.

The robot apparatus 100 includes a main frame 102, a vertical telescopic arm 104, a housing 106 in which drive units, various control units, and the like for the vertical telescopic arm 104 are provided, an X-direction drive unit that moves the housing 106 in a longitudinal direction of the main frame 102 (a direction orthogonal to the longitudinal direction of the main girder 2) (X direction), a Y-direction drive unit that moves the entire robot apparatus 100 in the longitudinal direction of the main girder 2 (Y direction), and a Z-direction drive unit that makes the vertical telescopic arm 104 elongate and contract in a vertical direction (Z direction).

The X-direction drive unit includes a ball screw 108A that is provided in the longitudinal direction of the main frame 102 (X direction), a ball nut 108B that is provided in the housing 106, and a motor 108C that rotates the ball screw 108A; and rotates the ball screw 108A in a normal direction or a reverse direction by the motor 108C to move the housing 106 in the X direction.

The Y-direction drive unit includes tires 110A and 110B that are provided at both ends of the main frame 102 and motors (not shown) that are provided in the tires 110A and 110B; and drives the tires 110A and 110B by the motors to move the entire robot apparatus 100 in the Y direction.

The robot apparatus 100 is installed in an aspect in which the tires 110A and 110B provided at both ends of the main frame 102 are placed on lower flanges of the two main girders 2 and are disposed so that the main girders 2 are positioned between the tires 110A and 110B. Accordingly, the robot apparatus 100 can move (be self-propelled) along the main girders 2 while being suspended from the lower flanges of the main girders 2. Further, although not shown, the main frame 102 is adapted so that the length of the main frame 102 can be adjusted in accordance with an interval between the main girders 2.

The vertical telescopic arm 104 is provided in the housing 106 of the robot apparatus 100, and is moved in the X direction and the Y direction together with the housing 106. Further, the vertical telescopic arm 104 is made to elongate and contract in the Z direction.

The "imaging device" of the invention is not limited to a digital camera mounted on the robot apparatus. The "imaging device" of the invention may be, for example, a digital camera mounted on a drone (flying device) and a digital camera carried by a person.

Further, the "image" of the invention is not limited to a still image. The "image" of the invention may be a moving image.

The imaging device 200 includes an imaging element and an imaging lens.

First Embodiment

Figure 4:
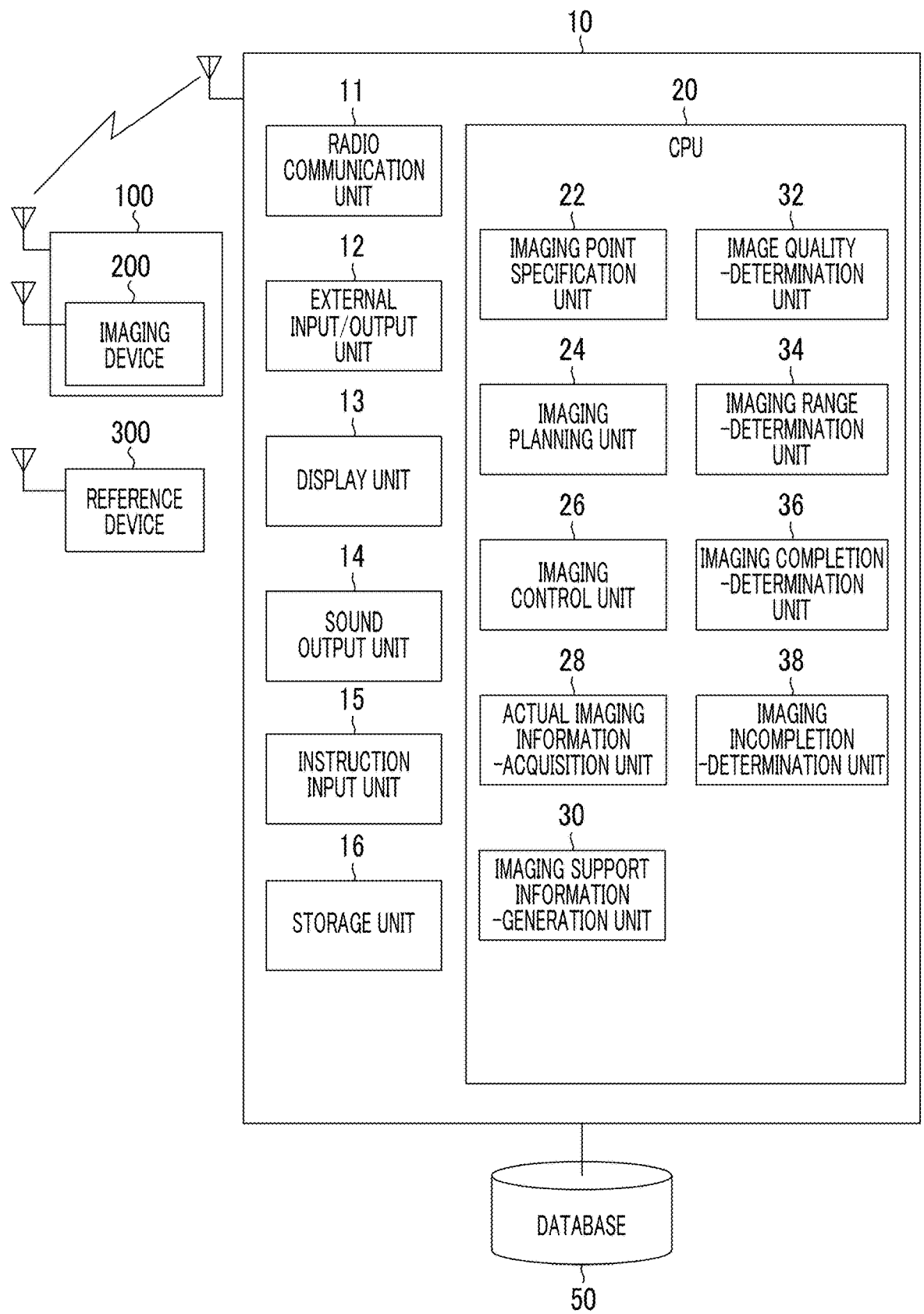
FIG. 4 is a block diagram of an example of an imaging support device according to the invention.

FIG. 4 is a block diagram of an example of an imaging support device according to the invention.

The imaging support device 10 of this embodiment is a computer device that supports the imaging of a structure using the imaging device 200. The imaging support device 10 includes a radio communication unit 11 that communicates by radio, an external input/output unit 12 that that inputs and outputs various types of information to and from a database 50, a display unit 13 (which is one form of an "display device") that displays information to a user, a sound output unit 14 that outputs sound to the user, an instruction input unit 15 that receives an instruction input from the user, a storage unit 16 that stores a program and information required for the execution of the program, and a central processing unit (CPU) 20 that controls the respective units of the imaging support device 10 according to the program stored in the storage unit 16.

The radio communication unit 11 is formed of a radio communication device that communicates with the imaging device 200 and an external device, which can communicate by radio, such as a reference device 300, by radio.

The external input/output unit 12 is formed of a device that can communicate with the database 50 through a network. A device, which inputs and outputs information to and from an external storage device, such as a memory card, of the imaging support device 10, may be used as the external input/output unit 62.

The external input/output unit 12 of this embodiment acquires drawing information of the structure, image quality information of a taken image, imaging performance information of the imaging device 200, moving range information of the imaging device 200, and imaging point-related information related to an imaging point of the structure from the database 50. That is, the external input/output unit 12 of this embodiment is one form of a "drawing information-acquisition unit", an "image quality information-acquisition unit", an "imaging performance information-acquisition unit", a "moving range information-acquisition unit", and an "imaging point-related information-acquisition unit" of the invention.

The drawing information is, for example, computer aided design (CAD) drawing data. The drawing information may be non-CAD drawing data that is not created with CAD.

The image quality information is information that represents image quality required for a taken image obtained from the imaging using the imaging device 200 (hereinafter, referred to as "required image quality").

The imaging performance information includes information on the number of pixels of the imaging element of the imaging device 200, size information of the imaging element of the imaging device 200, and information on the focal length of the imaging lens of the imaging device 200. The information on the number of pixels is information corresponding to the number of pixels of the imaging element of the imaging device 200 (hereinafter, referred to as "the number of pixels of the imaging element"), and is not limited to information that is expressed by the number of pixels itself. The size information is information corresponding to the size of the imaging element of the imaging device 200 (hereinafter, referred to as "the size of the imaging element"), and is not limited to information that is expressed by the physical quantity of a size. The information on the focal length is information corresponding to the focal length of the imaging lens of the imaging device 200, and is not limited to information that is expressed by a focal length itself. For example, the size information may be identification information, such as "full size". For example, a case in which the imaging performance information is expressed by the angle of view and the number of pixels of the imaging element, which are determined depending on a focal length and the size of the imaging element, is also included in the invention.

Further, the imaging performance information may include information on at least one of a contrast, a focus, a blur, a shake, the angle of view, noise, a compression rate, white balance, or a shutter speed.

The moving range information represents a range where the imaging device 200 can be moved or a range where the imaging device 200 cannot be moved.

The imaging point-related information includes at least one of, for example, member type information that represents the type of a member of a structure, damage type information that represents the type of damage to a structure, or structure type information that represents the type of the configuration of a structure.

The display unit 13 is formed of, for example, a liquid crystal display (LCD). Other display devices, such as an organic electroluminescent display, may be used as the display unit 13.

The sound output unit 14 is formed of, for example, a speaker.

The instruction input unit 15 is formed of, for example, a touch panel. The instruction input unit 15 may be formed of a keyboard and a mouse. Other input devices may be used as the instruction input unit 15. For example, a voice input device may be used as the instruction input unit 15.

The storage unit 16 is a storage device that is provided in the imaging support device 10, and includes a read only memory (ROM), a random access memory (RAM), and an electrically erasable programmable read only memory (EEPROM). Other storage devices may be used.

The CPU 20 of this embodiment includes: an imaging point specification unit 22 that specifies an imaging point of the structure on the basis of the drawing information; an imaging planning unit 24 that acquires imaging position information representing a scheduled imaging position of the imaging device 200 at each imaging of the structure and imaging range information representing a scheduled imaging range of the imaging device 200 at each imaging of the structure on the basis of the specified imaging point and the image quality information, and generates imaging plan information including the imaging position information and the imaging range information; an imaging control unit 26 that controls the imaging device 200 through the radio communication unit 11; an actual imaging information-acquisition unit 28 that acquires actual imaging information including actual imaging position information of the imaging device 200 at each imaging of the structure and actual imaging range information of the imaging device 200 at each imaging of the structure; an imaging support information-generation unit 30 combines the imaging plan information and the actual imaging information with the drawing information and allows the display unit 13 to display the combined information; an image quality-determination unit 32 that determines whether or not the actual image quality of a taken image obtained by the imaging device 200 matches required image quality; an imaging range-determination unit 34 that determines whether or not the scheduled imaging range and an actual imaging range are appropriate on the basis of the imaging range information of the imaging plan information and the actual imaging range information; an imaging completion-determination unit 36 that determines whether or not the imaging of the imaging point of the structure is completed; and an imaging incompletion-determination unit 38 that determines whether or not the incomplete imaging of the imaging point of the structure is present and a user has a mind to complete imaging.

Next, the specification of the imaging point performed by the imaging point specification unit 22 will be described. There are various aspects of the specification of the imaging point performed by the imaging point specification unit 22, but the imaging point specification unit 22 specifies the imaging point using at least the drawing information. For example, the imaging point specification unit 22 specifies the entire exposed surface of a concrete member (for example, the exposed surface of the deck slab 6) of the bridge 1 of FIG. 1 as an imaging point for inspection.

Next, the generation of the imaging plan information performed by the imaging planning unit 24 will be described. The imaging planning unit 24 of this embodiment acquires imaging position information and imaging range information, which satisfy image quality required for a taken image, on the basis of at least the imaging point that is specified by the imaging point specification unit 22 and the image quality information that is acquired from the database 50 by the external input/output unit 12. Further, the imaging planning unit 24 generates the imaging plan information that represents the permutation of imaging positions in a range where the imaging device 200 can be moved.

Next, the control of the imaging device performed by the imaging control unit 26 will be described. The imaging control unit 26 of this embodiment controls the imaging device 200 and the robot apparatus 100 on the basis of the imaging plan information. The imaging device 200 of this embodiment is mounted on the robot apparatus 100, and performs first imaging control processing for transmitting an instruction to the robot apparatus 100 through the radio communication unit 11 to control the actual imaging position and the actual imaging direction of the imaging device 200 and second imaging control processing for transmitting an instruction to the imaging device 200 through the radio communication unit 11 to control the imaging of the imaging device 200.

Figure 5:
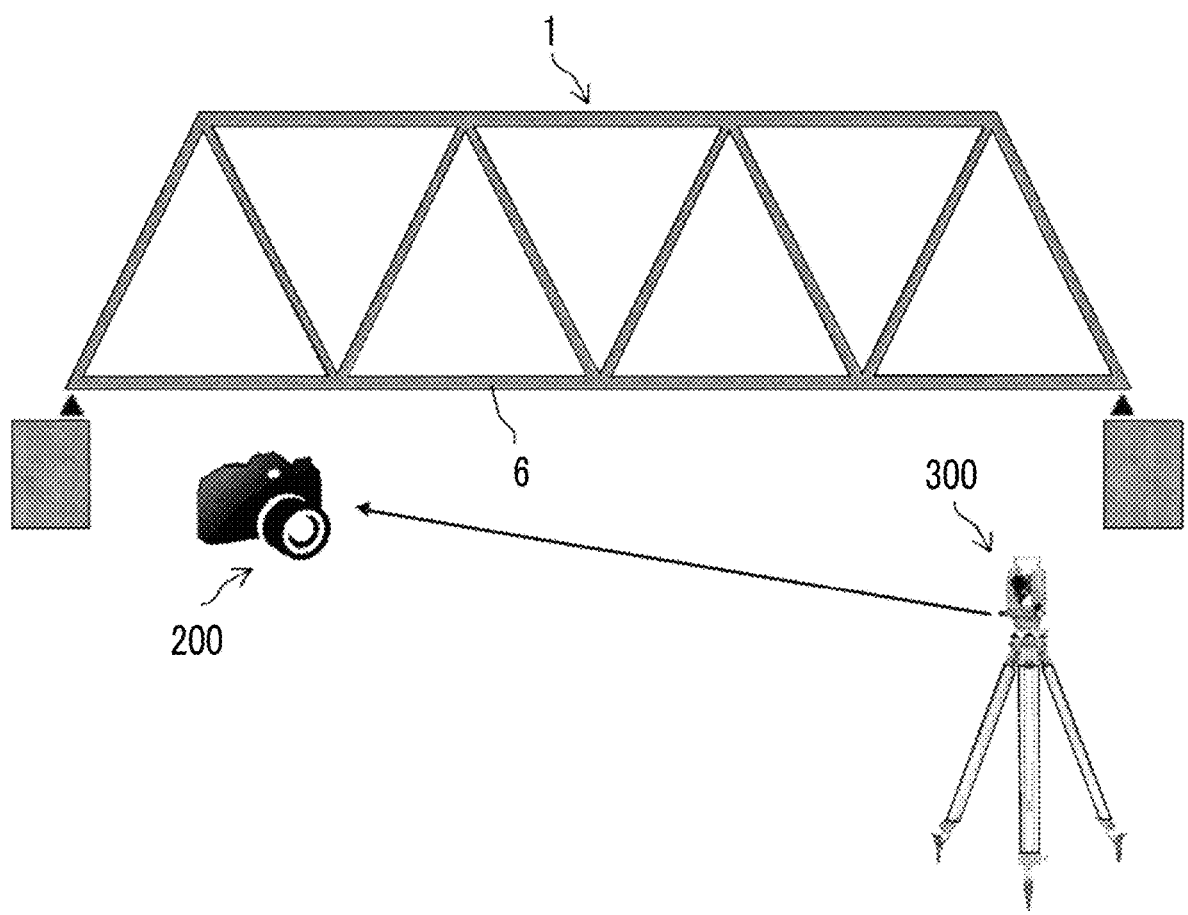
FIG. 5 is a diagram used to illustrate the acquisition of actual imaging position information using a total station.

Next, the acquisition of the actual imaging position information and the acquisition of the actual imaging range information, which are performed by the actual imaging information-acquisition unit 28, will be described. As shown in FIG. 5, the actual imaging information-acquisition unit 28 of this embodiment communicates with the reference device 300 of which the absolute position is known through the radio communication unit 11 to acquire actual imaging position information that represents the current imaging position of the imaging device 200. For example, a total station is used as the reference device 300. The total station is one of measuring instruments, and includes an electro-optical distance meter (distance measurement unit) that measures a distance ad a theodolite (angle measurement unit) that measures an angle. That is, the total station simultaneously measures a distance to the imaging device 200 and an angle with respect to the imaging device 200. The actual imaging information-acquisition unit 28 of this embodiment receives the distance and the angle, which are measured by the total station, from the total station through the radio communication unit 11 to acquire the actual imaging position information of the imaging device 200. Further, the actual imaging information-acquisition unit 28 of this embodiment acquires actual imaging range information, which represents the current imaging range of the imaging device 200, on the basis of the actual imaging position information.

Next, the generation of imaging support information performed by the imaging support information-generation unit 30 will be described. There are various aspects of the generation of imaging support information performed by the imaging support information-generation unit 30. For example, the imaging support information-generation unit 30 combines the imaging range information at each imaging, which is included in the imaging plan information, and the actual imaging range information at each imaging with the drawing information. The imaging support information-generation unit 30 may combine an image, which is taken by the imaging device 200, as the actual imaging range information with the drawing information. Further, it is preferable that the imaging support information-generation unit 30 combines the imaging position information at each imaging, which is included in the imaging plan information, and the actual imaging position information at each imaging with the drawing information. That is, the imaging support information-generation unit 30 functions as a display processing unit that combines the imaging plan information and the actual imaging information with the drawing information and allows the display unit 13 to display the combined information. Furthermore, the imaging support information-generation unit 30 generates the following various types of warning information (image quality-inappropriateness information, imaging range-inappropriateness information, imaging incompletion information, and the like) that are to be displayed on the display unit 13. That is, the imaging support information-generation unit 30 also functions as a display processing unit that allows the display unit 13 to display various types of warning information. Moreover, the imaging support information-generation unit 30 also functions as a display processing unit that allows the display unit 13 to display notification information, such as imaging completion information.

Figure 6:
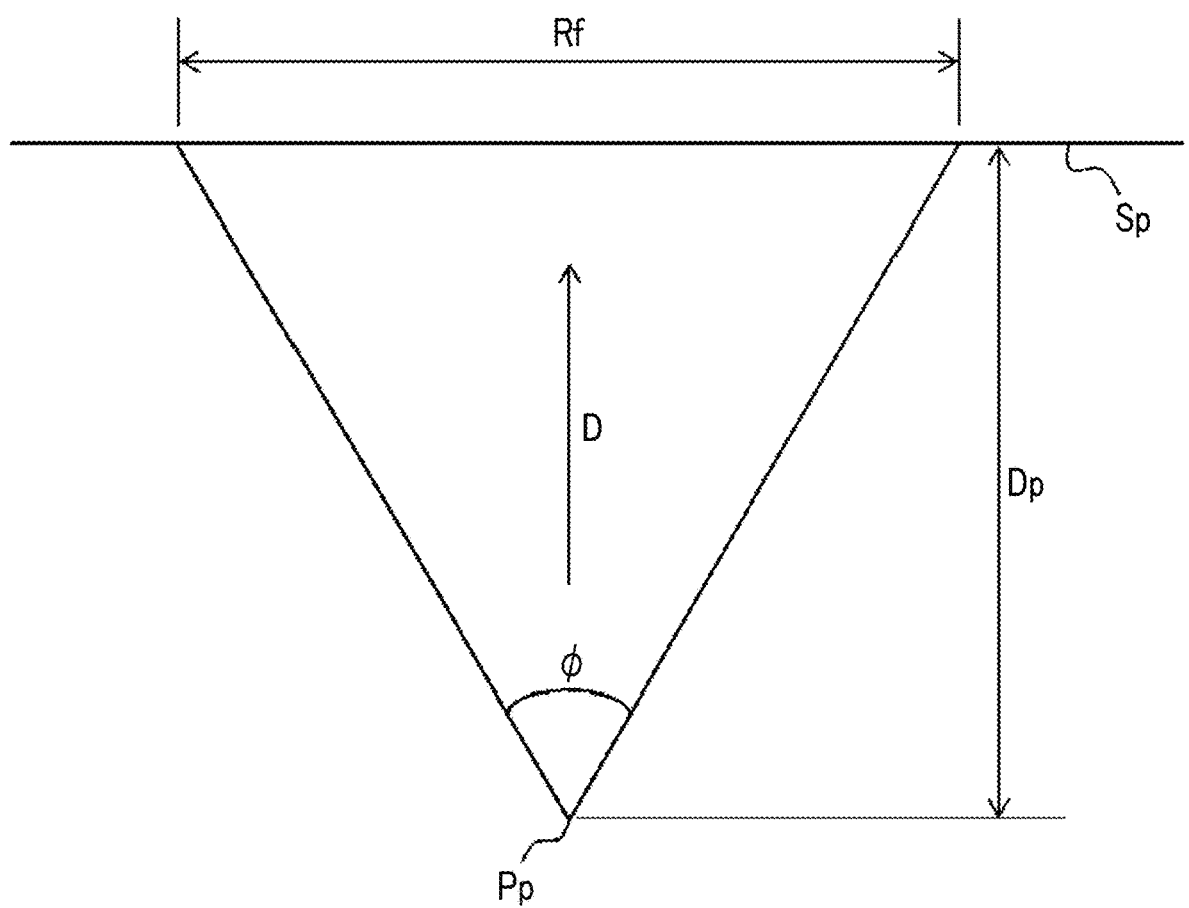
FIG. 6 is a diagram showing a relationship among required pixel density, imaging performance information, and actual imaging position information.

Next, the determination of image quality performed by the image quality-determination unit 32 will be described. The image quality-determination unit 32 of this embodiment determines whether or not a taken image satisfies required pixel density (which is an example of the image quality information). A relationship among the required pixel density, the imaging performance information, and the actual imaging position information will be described with reference to FIG. 6. The required pixel density is the number of pixels required per unit length of a surface Sp to be imaged in a taken image. The required pixel density required for the recognition of the crack state of the deck slab 6 formed of the concrete member of the bridge 1, that is, the number of pixels required per unit length of the exposed surface (which is the surface Sp to be imaged) of the deck slab 6 is determined in advance. In a case in which, for example, the required pixel density required for the detection of a crack having a width of 0.1 mm is Pr [pixel/mm] and the imaging direction D of the imaging device 200 is orthogonal to the surface Sp to be imaged (that is, an image is taken in a state in which the imaging device 200 faces the surface Sp to be imaged in a direction perpendicular to the surface Sp to be imaged), the image quality-determination unit 32 can determine whether or not the taken image satisfies the required pixel density Pr on the basis of the number of pixels of the imaging element of the imaging device 200, the size of the imaging element of the imaging device 200, the focal length of the imaging device 200 (corresponding to the angle φ of view), and a distance Dp between an actual imaging position Pp of the imaging device 200 and the surface Sp to be imaged. The required image quality may be expressed by an inverse number of the required pixel density (required resolution). The imaging range of the imaging device 200 needs to include a requirement matching range Rf, which satisfies the required pixel density Pr, of the surface Sp to be imaged.

In a case in which the image quality-determination unit 32 determines that the taken image does not satisfy the required pixel density, the imaging support information-generation unit 30 generates warning information (image quality-inappropriateness information) representing that the image quality of the taken image is inappropriate. That is, the image quality-inappropriateness information is displayed on the display unit 13.

Next, the determination of an imaging range performed by the imaging range-determination unit 34 will be described.

In a case in which the imaging point (which is the imaging point specified by the imaging point specification unit 22) of the structure is subjected to split imaging a plurality of times by the imaging device 200, the imaging range-determination unit 34 determines whether or not one taken image and another taken image overlap each other by a width equal to or larger than a certain width. The "certain width" of this embodiment is equal to or larger than an allowable error between the scheduled imaging position, which is represented by the imaging position information of the imaging plan information of the taken image and the current imaging position represented by the actual imaging position information.

The imaging range-determination unit 34 of this embodiment performs the determination of whether or not the imaging range of one taken image of an imaging point (which is a scheduled imaging range represented by imaging range information included in the imaging plan information) and the imaging range of another taken image of the imaging point (which is a scheduled imaging range represented by another imaging range information included in the imaging plan information) overlap each other by a certain width or more, as first imaging range determination.

The imaging range-determination unit 34 of this embodiment performs the determination of whether or not the actual imaging range of one taken image of an imaging point (which is the current imaging range of one taken image having been taken) and the imaging range of another taken image of the imaging point (which is a scheduled imaging range of another taken image not yet taken) overlap each other by a certain width or more, as second imaging range determination.

The imaging range-determination unit 34 of this embodiment performs the determination of whether or not the actual imaging range of one taken image of an imaging point and the actual imaging range of another taken image of the imaging point overlap each other by a certain width or more, as third imaging range determination.

In a case in which the imaging range-determination unit 34 determines that the imaging range of the taken image is inappropriate, the imaging support information-generation unit 30 generates warning information (imaging range-inappropriateness information) representing that the imaging range is inappropriate. That is, the imaging range-inappropriateness information is displayed on the display unit 13.

Next, the determination of imaging completion performed by the imaging completion-determination unit 36 will be described.

The imaging completion-determination unit 36 determines whether or not the imaging of the imaging point of the structure is completed. In a case in which the imaging completion-determination unit 36 determines that the imaging of the imaging point of the structure is completed, the imaging support information-generation unit 30 generates imaging completion information that is to be displayed on the display unit 13. That is, the imaging completion information is displayed on the display unit 13.

Next, the determination of incomplete imaging performed by the imaging incompletion-determination unit 38 will be described. The imaging incompletion-determination unit 38 determines whether or not the incomplete imaging of the imaging point of the structure is present and a user has a mind to complete imaging.

There are various types of the determination of whether or not a user has a mind to end imaging (the determination of a mind to end imaging) performed by the imaging incompletion-determination unit 38. First, there is an aspect where it is determined that a user has a mind to end imaging in a case in which a distance between a scheduled imaging position of an incomplete taken image and the imaging device 200 exceeds a threshold value. Second, there is an aspect where it is determined that a user has a mind to end imaging in a case in which an instruction to stop at least one of the imaging device 200 or the imaging support device 10 is input.

In a case in which the imaging incompletion-determination unit 38 determines that the incomplete imaging of the imaging point of the structure is present and a user has a mind to complete imaging, the imaging support information-generation unit 30 generates warning information that is to be displayed on the display unit 13 (display device). That is, the imaging support information-generation unit 30 generates warning information (imaging incompletion information) representing that imaging is uncompleted. That is, the imaging incompletion information is displayed on the display unit 13.

Next, a specific example of imaging support processing of the first embodiment, which is performed by the CPU 20 according to a program, will be described separately using Examples 1 to 3.

Example 1 of Imaging Support Processing

Figure 7:
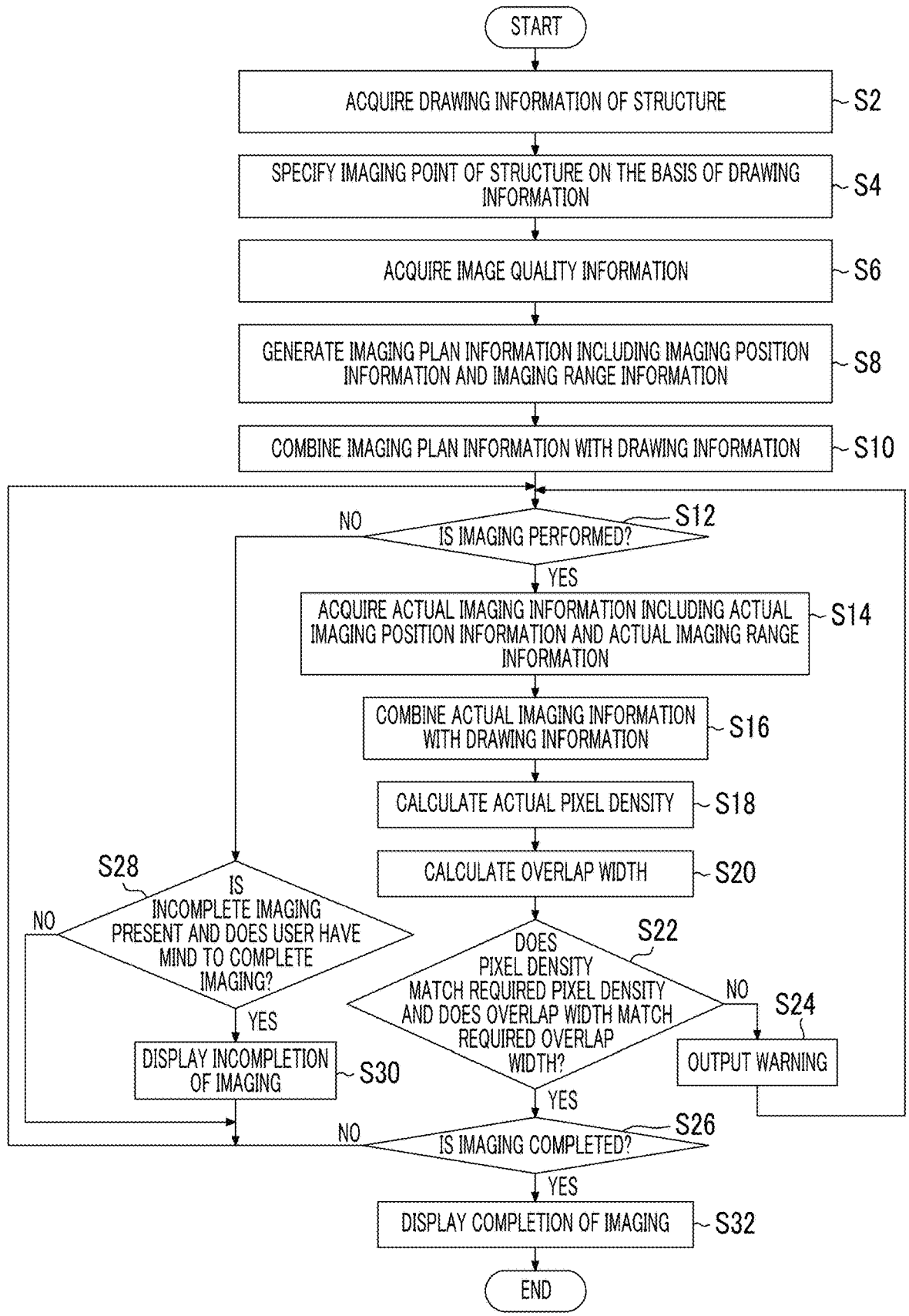
FIG. 7 is a flowchart showing the flow of Example 1 of imaging support processing of a first embodiment.

FIG. 7 is a flowchart showing the flow of Example 1 of imaging support processing of the first embodiment. This processing is performed by the CPU 20 according to a program stored in the storage unit 16. A case in which the bridge 1 of FIG. 1 is imaged as a structure to be inspected will be described below by way of example.

Steps S2 to S10 are performed in a state in which the imaging support device 10 is connected to the database 50 through a network. Here, the network may be a local area network and may be a global area network. A security network may be used.

First, the drawing information of the structure is acquired from the database 50 by the external input/output unit 12 (Step S2). In this embodiment, the CAD drawing data of the bridge 1 is acquired as the drawing information.

Next, the imaging point of the structure is specified on the basis of the drawing information by the imaging point specification unit 22 (Step S4). In this embodiment, to inspect the deck slab 6 of the bridge 1 formed of a concrete member, the entire exposed surface of the deck slab 6 is specified as the imaging point. Here, region information (hereinafter, referred to as "imaging point-region information") representing the entire range of the imaging point of which the origin is the reference position of the deck slab 6 (which is the entire exposed surface of each panel of the deck slab 6) is generated.

Next, image quality information required for the taken image is acquired from the database 50 by the external input/output unit 12 (Step S6). Image quality information corresponding to the width of "crack", which requires the highest image quality, of damage to the deck slab 6 made of concrete is acquired in this embodiment. In this embodiment, the pixel density of the taken image required for the exposed surface (which is the surface to be imaged) of the deck slab 6 (hereinafter, referred to as "required pixel density") is acquired as the image quality information. The required pixel density is expressed by the number of pixels per unit length of the surface to be imaged. Further, an overlap width required for the taken image (hereinafter, referred to as a "required overlap width") is acquired in this embodiment. The required overlap width is the width of an overlapping portion between one taken image and another taken image adjacent to the taken image. In other words, the required overlap width is the width of an overlapping portion between adjacent imaging ranges.

Next, the imaging position information of the imaging device 200 at each imaging and the imaging range information of the imaging device 200 at each imaging are acquired by the imaging planning unit 24 on the basis of the imaging point that is specified in Step S4 and the image quality information that is acquired in Step S6 (Step S8).

Since the number of pixels of the imaging element of the imaging device 200, the size of the imaging element of the imaging device 200, and the focal length of the imaging lens of the imaging device 200 are fixed in advance in this embodiment, imaging performance is constant over a plurality of times of imaging of one panel of the deck slab 6 of the bridge 1. Further, a plurality of times of imaging is performed while only the imaging position of the imaging device 200 is changed, and the imaging direction of the imaging device 200 is not changed. Furthermore, a range where the imaging device 200 can be moved is not limited (there is no range where the imaging device 200 cannot be moved).

Imaging plan information, which includes the acquired imaging position information and the acquired imaging range information, is stored in the storage unit 16.

Steps S10 to S32 are performed in an inspection site where the structure is present. The imaging support device 10 can communicate with the robot apparatus 100, the imaging device 200, and the reference device 300 by radio in the inspection site. The imaging support device 10 may have access to the database 50 in the inspection site, but does not need to have access to the database 50 in a case in which information required for Steps S10 to S32 (for example, the drawing information and the imaging plan information) is stored in the storage unit 16 in advance before Step S10.

Figure 8:
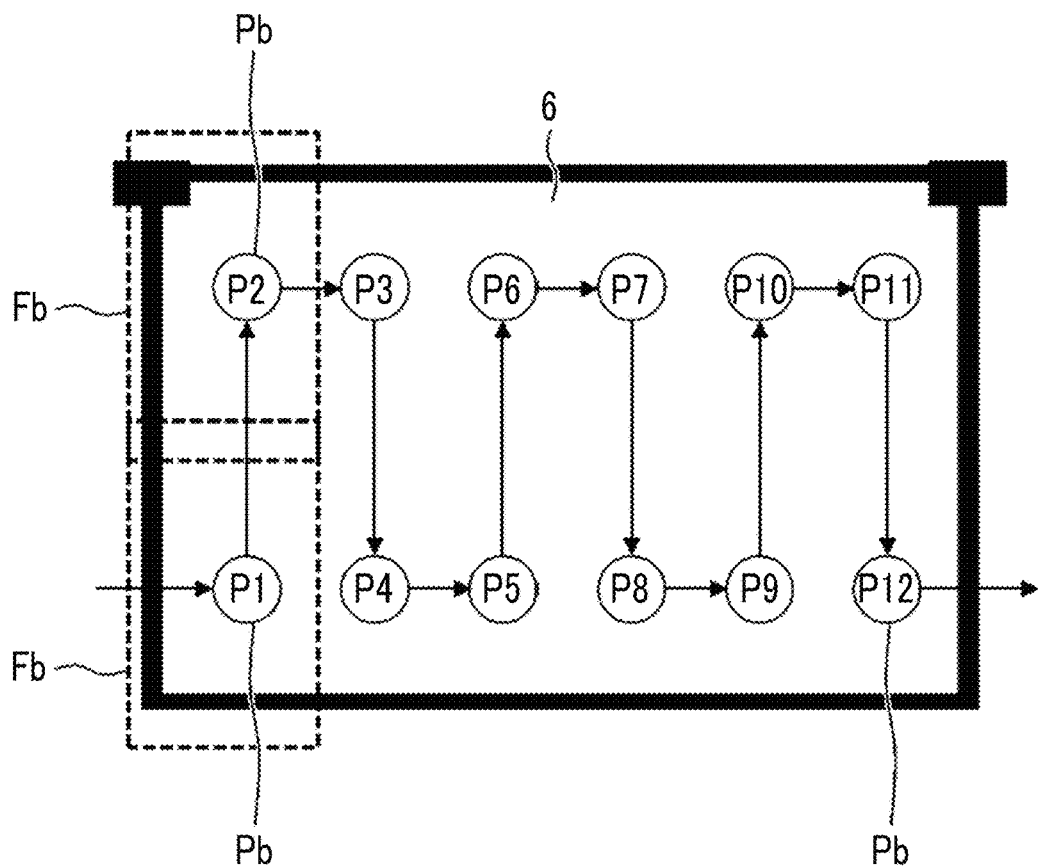
FIG. 8 is a diagram showing an example of display in a case in which scheduled imaging position information and scheduled imaging range information at each imaging are combined with drawing information.

First, the imaging support information-generation unit 30 combines the imaging plan information with the drawing information and allows the display unit 13 to display the combined information (Step S10). For example, in a case in which the deck slab 6 is imaged in panel and one panel is split into twelve pieces and each of the twelve pieces is imaged as shown in FIG. 8, the imaging support information-generation unit 30 combines imaging position information Pb and imaging range information Fb with the drawing information at each of a total of twelve times of split imaging. On the other hand, an aspect in which only the imaging range information is combined with the drawing information and the imaging position information is not combined with the drawing information may be made, and an aspect in which only the imaging position information is combined with the drawing information and the imaging range information is not combined with the drawing information may be made.

Next, the imaging control unit 26 determines whether or not one time of imaging is performed by the imaging device 200 (Step S12).

Then, the actual imaging position information and the actual imaging range information of the imaging device 200 are acquired by the actual imaging information-acquisition unit 28 (Step S14).

In this embodiment, as shown in FIG. 5, the current position of the imaging device 200 is measured by the reference device 300 (for example, a total station) of which the absolute position is known. For example, in a case in which the deck slab 6 is imaged by the imaging device 200, the imaging device 200 transmits the taken image to the imaging support device 10 through radio communication. The imaging support device 10 makes the image, which is received from the imaging device 200 through radio communication, and the actual imaging position information, which is received from the reference device 300 through radio communication, be associated with each other and stores the image and the actual imaging position information in the storage unit 16. The imaging support device 10 may record the image and the actual imaging position information in an external device (not shown) instead of storing the image and the actual imaging position information in the storage unit 16. Further, an imaging instruction and the actual imaging position information (which is information received from the reference device 300 through radio communication) are transmitted to the imaging device 200 from the imaging support device 10 through radio communication, and an image and the actual imaging position information may be stored in association with each other by the imaging device 200. The reference device 300 measures the reference position of the deck slab 6 of the bridge 1, and can calculate the actual imaging position information of which the origin is the reference position of the deck slab 6.

The actual imaging information-acquisition unit 28 can acquire the actual imaging range information on the basis of the actual imaging position information. Since the imaging direction of the imaging device 200 is constant in this embodiment and the imaging conditions of the imaging device 200 are constant, the actual imaging information-acquisition unit 28 can acquire the actual imaging range information while using only the actual imaging position information as a parameter.

Next, required information of the information generated in Step S14 (actual imaging information including the actual imaging position information and the actual imaging range information) is combined with the drawing information by the imaging support information-generation unit 30 (Step S16). On the other hand, an aspect in which only the actual imaging range information is combined with the drawing information and the actual imaging position information is not combined with the drawing information may be made, and an aspect in which only the actual imaging position information is combined with the drawing information and the actual imaging range information is not combined with the drawing information may be made.

Figure 9:
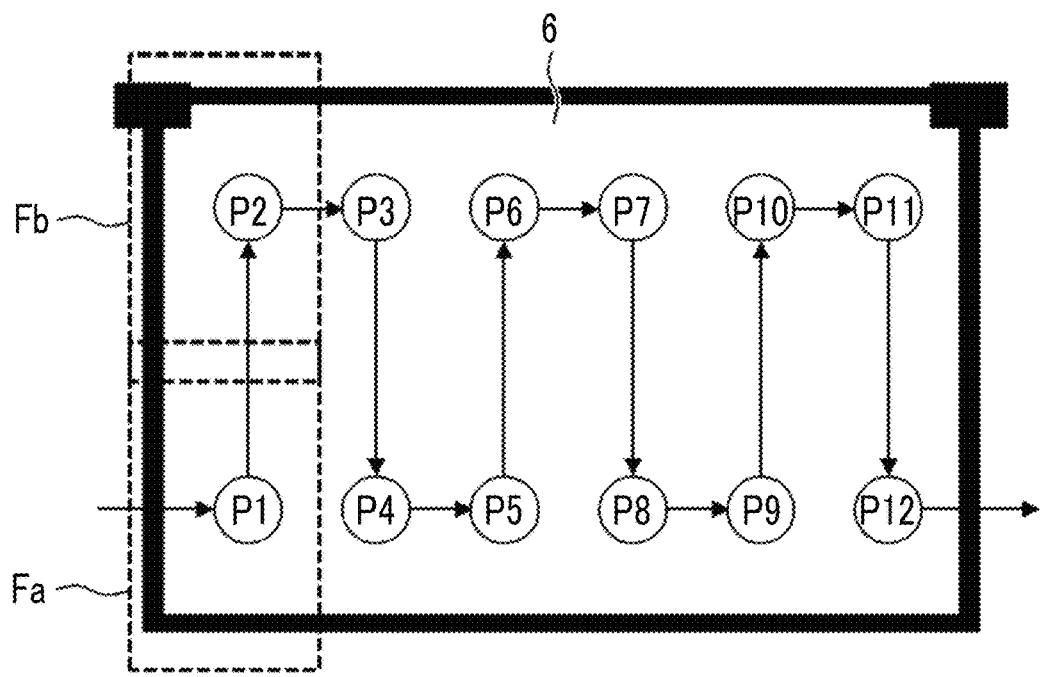
FIG. 9 is a diagram showing an example of display in a case in which scheduled imaging position information, scheduled imaging range information, and actual imaging range information at each imaging are combined with drawing information.

FIG. 9 shows an example of display in which a frame Fa showing the actual imaging range of the imaging device 200 (hereinafter, referred to as an "actual imaging range frame") is combined with the drawing information.

Then, the actual pixel density of the taken image is calculated by the image quality-determination unit 32 (Step S18), the imaging range-determination unit 34 calculates the overlap width of the actual imaging range (Step S20), and the imaging range-determination unit 34 determines whether or not the actual pixel density matches the required pixel density and the overlap width matches the required overlap width (Step S22).

If it is determined that the actual pixel density of the taken image does not match the required pixel density or the overlap width of the taken image does not match the required overlap width (If the result of the determination in Step S22 is "NO"), warning information is output to the display unit 13 (Step S24) and processing returns to Step S12. That is, the display unit 13 is allowed to display warning information and prompts a user to take an image again.

If it is determined that the actual pixel density of the taken image matches the required pixel density and the overlap width of the taken image matches the required overlap width (If the result of the determination in Step S22 is "YES"), the imaging completion-determination unit 36 determines whether or not all of a plurality of times of imaging of the imaging point end (Step S26). If it is determined that the imaging is completed (If the result of the determination in Step S26 is "YES"), the completion of the imaging is displayed (Step S32) and this processing ends.

If the result of the determination in Step S12 is "NO", the imaging incompletion-determination unit 38 determines whether or not the incomplete imaging of the imaging point is present and a user has a mind to complete imaging (Step S28). If it is determined that the imaging is not completed and a user has a mind to complete imaging (If the result of the determination in Step S28 is "YES"), the incompletion of the imaging is displayed (Step S30).

In this embodiment, in a case in which an imaging range, which is not yet imaged, is present at the imaging point (in this embodiment, the entire exposed surface of the deck slab 6 of the bridge 1) and a distance between the imaging position of the incomplete imaging and the imaging device 200 exceeds a threshold value, the display unit 13 is allowed to display imaging incompletion information.

In a case in which an imaging range, which is not yet imaged, is present at the imaging point and an instruction to stop the imaging support device 10 is input to the instruction input unit 15, the display unit 13 may be allowed to display imaging incompletion information. In a case in which a stop instruction is input to the imaging device 200 in a state in which the imaging is incomplete, the display unit 13 may be allowed to display an imaging incompletion display.

A case in which the imaging direction of the imaging device 200 and the surface to be imaged of the structure are orthogonal to each other, that is, a case in which an image is taken in a state in which the imaging device 200 faces the surface to be imaged of the structure in a direction perpendicular to the surface to be imaged has been described in the above-mentioned embodiment, but the invention is not limited to this case. Since inclination angle information on an inclination angle of the surface to be imaged of the structure with respect to a plane orthogonal to the imaging direction of the imaging device 200 is acquired and it is determined whether or not a taken image satisfies the required image quality on the basis of the inclination angle information, it is possible to acquire images satisfying the required image quality without omission even in a case in which the imaging device 200 faces the surface to be imaged in a direction not perpendicular to the surface to be imaged. Examples of a method of acquiring the inclination angle information of the surface to be imaged include a method of measuring an inclination angle by an inclination angle measuring device, a method of calculating an inclination angle from plural pieces of distance information, and the like. For example, the imaging device 200 may be formed of a twin-lens camera, and the inclination information of the surface to be imaged can be calculated on the basis of plural pieces of distance information on a distance between the imaging device 200 and the surface to be imaged.

Example 2 of Imaging Support Processing

Next, imaging support processing in a case in which the imaging performance information of the imaging device 200 is variable will be described. For example, there is a case where imaging performance information is variable since a plurality of types of the imaging device 200 that allowed to be used to image the bridge 1, are present.

Figure 10:
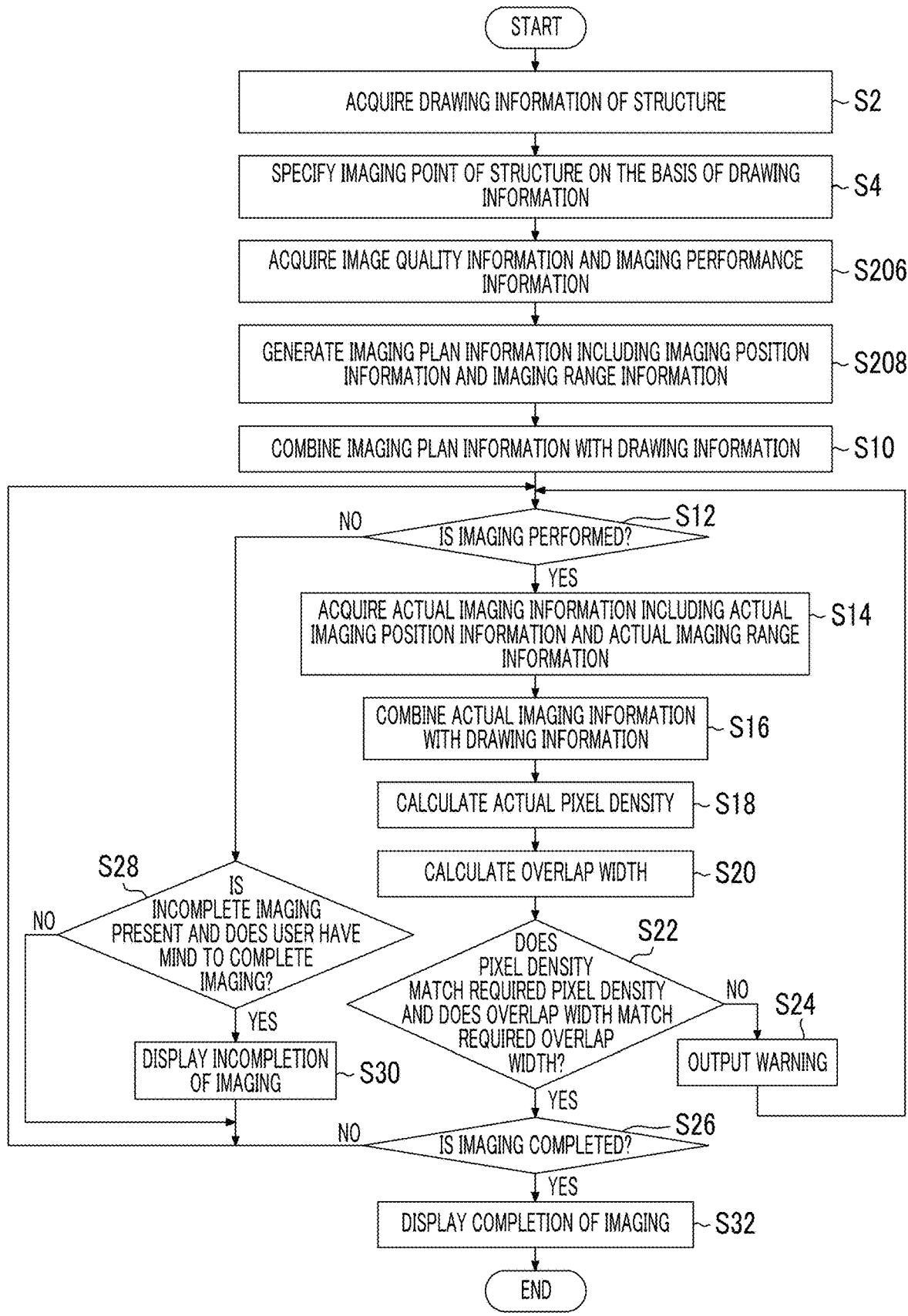
FIG. 10 is a flowchart showing the flow of Example 2 of the imaging support processing of the first embodiment.

FIG. 10 is a flowchart showing the flow of imaging support processing of Example 2. The same steps as the steps of Example 1 shown in FIG. 7 will be denoted by the same reference numerals as the reference numerals shown in FIG. 7 and the description thereof will be omitted in this embodiment.

In Step S206, image quality information and the imaging performance information of the imaging device 200 are acquired from the database 50 by the external input/output unit 12.

The imaging performance information of this embodiment includes information on the number of pixels of the imaging element of the imaging device 200, size information of the imaging element of the imaging device 200, and information on the focal length of the imaging lens of the imaging device 200.

In Step S208, the imaging planning unit 24 acquires imaging position information and imaging range information on the basis of the image quality information and the imaging performance information and generates imaging plan information (Step S208).

Example 3 of Imaging Support Processing

Next, imaging support processing in a case in which a range where the imaging device 200 can be moved is limited will be described.

Figure 11:
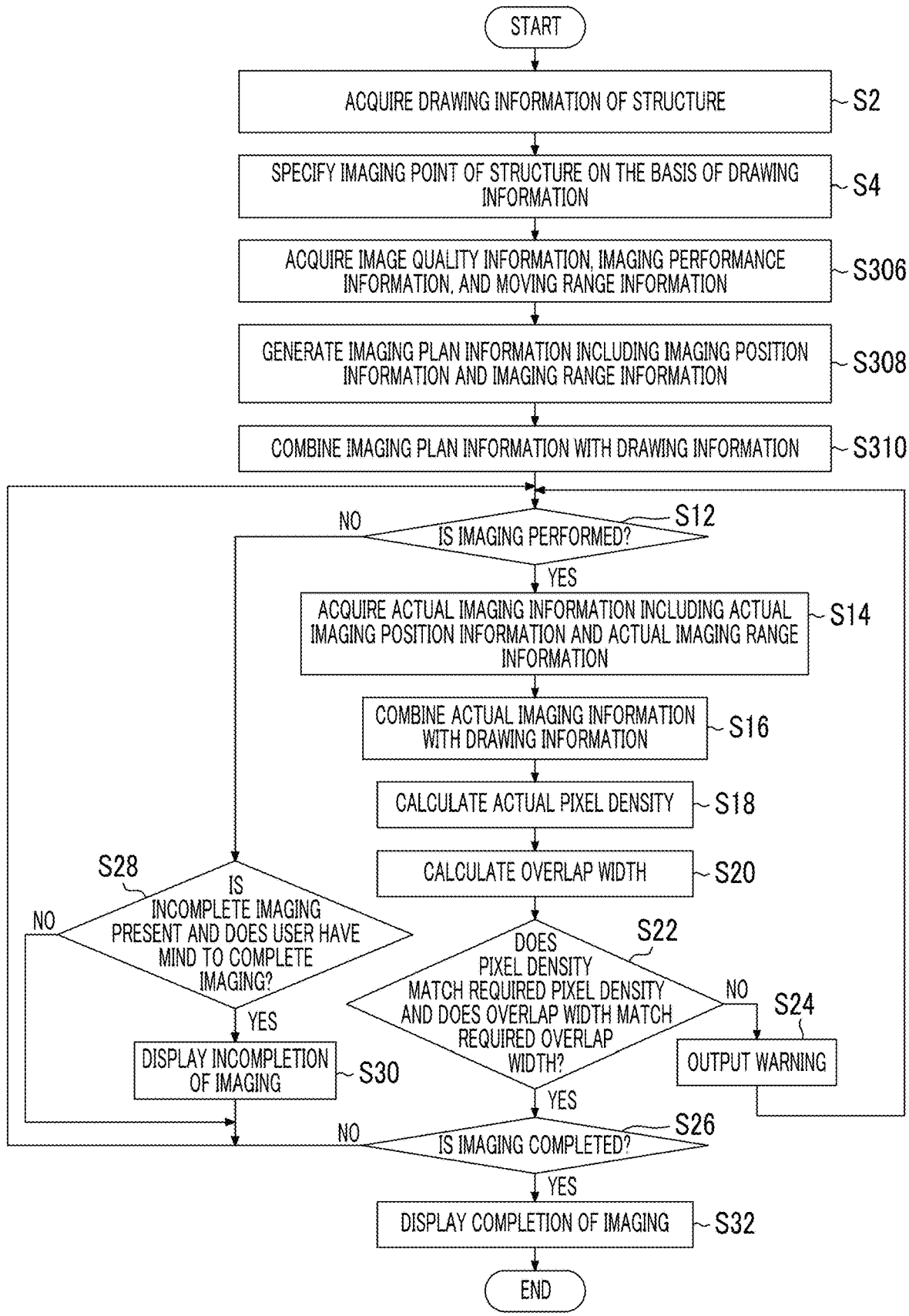
FIG. 11 is a flowchart showing the flow of Example 3 of the imaging support processing of the first embodiment.

FIG. 11 is a flowchart showing the flow of imaging support processing of Example 3. The same steps as the steps of Example 2 shown in FIG. 10 will be denoted by the same reference numerals as the reference numerals shown in FIG. 10 and the description thereof will be omitted in this embodiment.

In Step S306, the image quality information, the imaging performance information of the imaging device 200, and the moving range information of the imaging device 200 are acquired from the database 50 by the external input/output unit 12.

In this embodiment, a range where the imaging device 200 can be moved is limited according to the movable ranges of the robot apparatus 100 in the X direction and the Y direction and the movable range of the vertical telescopic arm 104 in the Z direction. Moving range information, which represents the limited range where the imaging device 200 can be moved, is acquired from the database 50.

In Step S308, imaging plan information is generated by the imaging planning unit 24 on the basis of the image quality information, the imaging performance information, and the moving range information. Here, the imaging planning unit 24 of this embodiment generates the imaging plan information that represents the permutation of imaging positions in the range where the imaging device 200 can be moved.

In Step S310, the imaging support information-generation unit 30 generates imaging support information, which allows the display unit 13 to display the permutation of imaging positions in the range where the imaging device 200 can be moved.

Second Embodiment

The imaging direction of the imaging device 200 is fixed in the first embodiment, but the imaging direction of an imaging device 200 is variable in a second embodiment.

Figure 12:
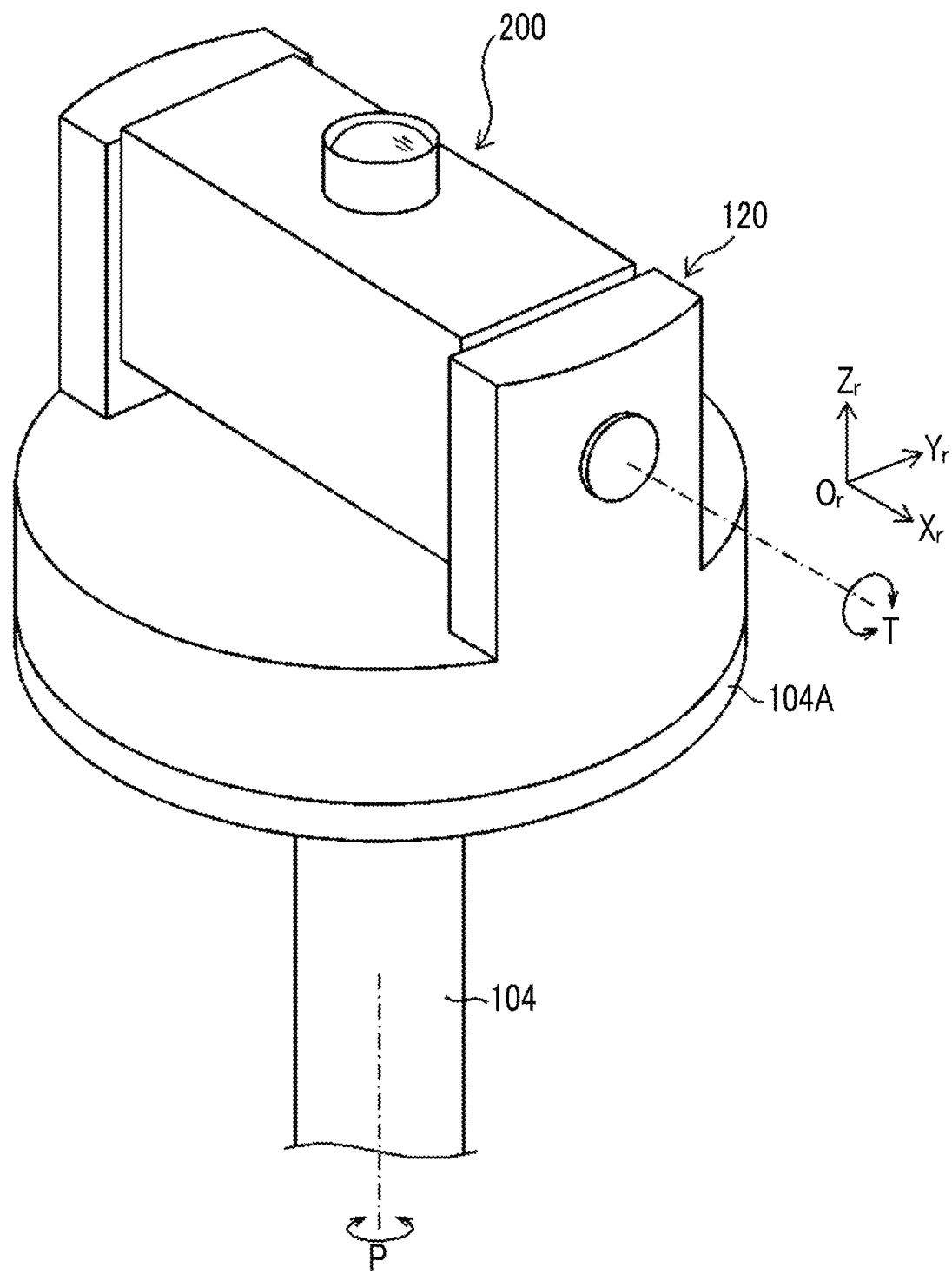
FIG. 12 is a perspective view showing the appearance of the imaging device and a pan/tilt mechanism.

As shown in FIG. 12, a robot apparatus 100 on which the imaging device 200 is mounted includes a pan/tilt mechanism 120 that controls the imaging direction of the imaging device 200.

A camera installation part 104A is provided at the distal end of the vertical telescopic arm 104, and the imaging device 200, which can be rotated in a pan direction and a tilt direction by the pan/tilt mechanism 120, is installed on the camera installation part 104A.

Figure 13:
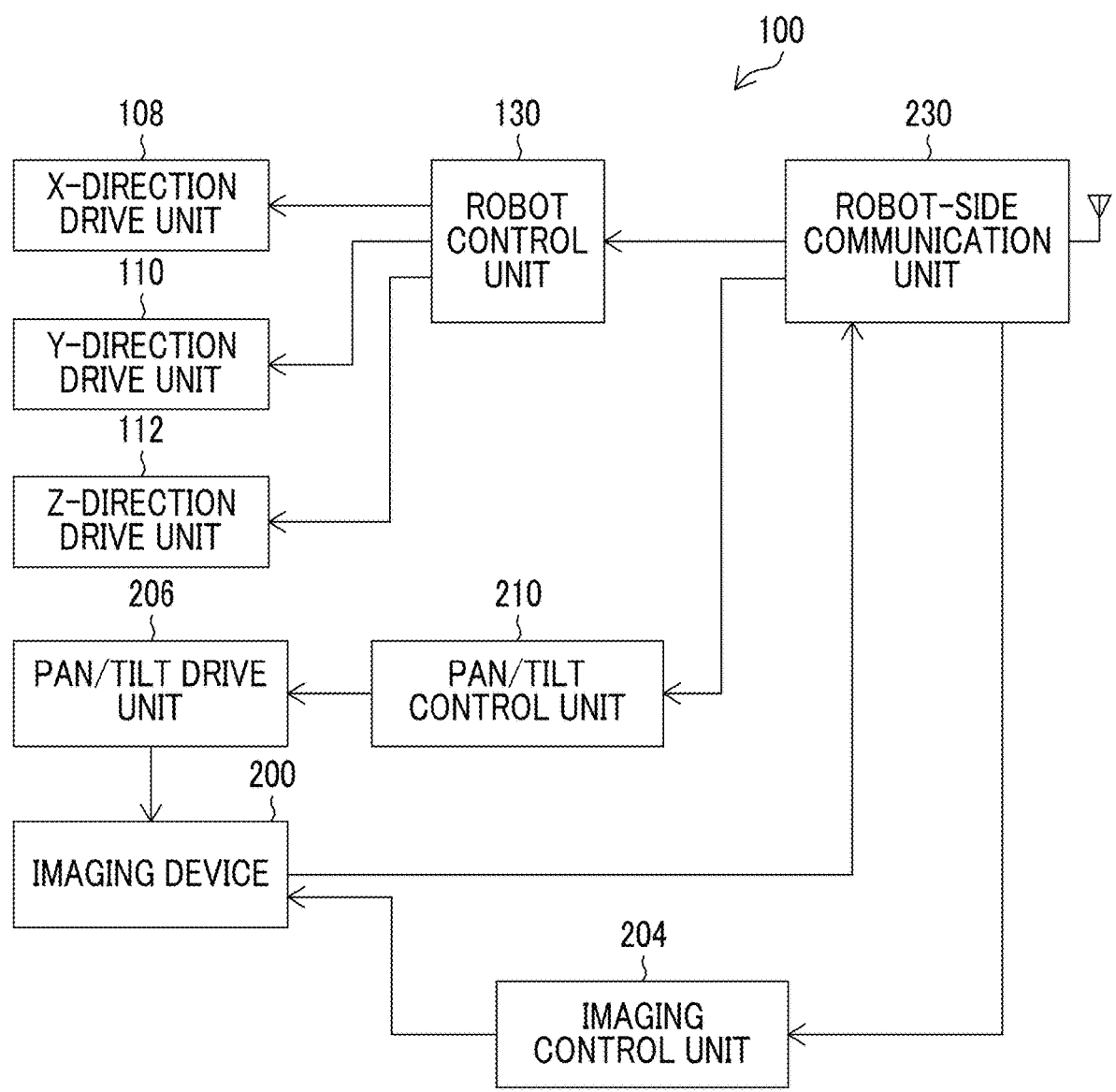
FIG. 13 is a block diagram of an example of the robot apparatus.

Further, the imaging device 200 is rotated about a pan axis P coaxial with the vertical telescopic arm 104 or is rotated about a tilt axis T parallel to a horizontal direction by the pan/tilt mechanism 120 to which a driving force is applied from a pan/tilt drive unit 206 (FIG. 13). Accordingly, the imaging device 200 can take images in any posture (take images in any imaging direction). The pan axis P is orthogonal to the tilt axis T.

Further, a camera coordinate system, which is based on the imaging device 200, uses an intersection point between the pan axis P and the tilt axis T as an origin Or; and the direction of the tilt axis T is referred to as an Xr-axis direction (referred to as an "X direction"), the direction of the pan axis P is referred to as a Zr-axis direction (referred to as a "Z direction"), and a direction orthogonal to an Xr axis and a Zr axis is referred to as a Yr-axis direction (referred to as a "Y direction").

The position (actual imaging position) of the imaging device 200 can be detected using the moving distances of the robot apparatus 100 in the X direction and the Y direction and the moving distance of the vertical telescopic arm 104 in the Z direction with respect to the origin of a coordinate system of a space in which a structure is present (hereinafter, referred to as a "spatial coordinate system"). Further, the imaging direction (actual imaging direction) of the imaging device 200 can be detected using the pan angle α and the tilt angle β of the pan/tilt mechanism 120. The imaging direction (actual imaging direction) of the imaging device 200 may be detected by a direction sensor (not shown) mounted on the imaging device 200.

FIG. 13 is a block diagram of an example of the robot apparatus 100.

The robot apparatus 100 shown in FIG. 13 includes a robot control unit 130, an X-direction drive unit 108, a Y-direction drive unit 110, a Z-direction drive unit 112, the imaging device 200, an imaging control unit 204, a pan/tilt control unit 210, the pan/tilt drive unit 206, and a robot-side communication unit 230.

The robot-side communication unit 230 performs two-way radio communication between the radio communication unit 11 of the imaging support device 10 and itself; receives various commands, such as a movement command for controlling the movement of the robot apparatus 100, a pan/tilt command for controlling the pan/tilt mechanism 120, and an imaging command for controlling the imaging device 200, which are transmitted from the radio communication unit 11 of the imaging support device 10; and outputs the received commands to the corresponding control units, respectively.

The robot control unit 130 controls the X-direction drive unit 108, the Y-direction drive unit 110, and the Z-direction drive unit 112 on the basis of a movement command, which is input from the robot-side communication unit 230, to make the robot apparatus 100 move in the X direction and the Y direction and to make the vertical telescopic arm 104 elongate and contract in the Z direction (see FIG. 2).

The pan/tilt control unit 210 makes the pan/tilt mechanism 120 be operated in the pan direction and the tilt direction by the pan/tilt drive unit 206 on the basis of a pan/tilt command, which is input from the robot-side communication unit 230, to pan and tilt the imaging device 200 in a desired direction (see FIG. 12).

The imaging control unit 204 makes the imaging device 200 take live-view images or taken images on the basis of an imaging command that is input from the robot-side communication unit 230.

Information that represents images taken by the imaging device 200 during the imaging of the bridge 1 and information that represents the imaging direction (in this embodiment, the pan angle α and the tilt angle β are transmitted to the radio communication unit 11 of the imaging support device 10 robot-side communication unit 230.

Figure 14:
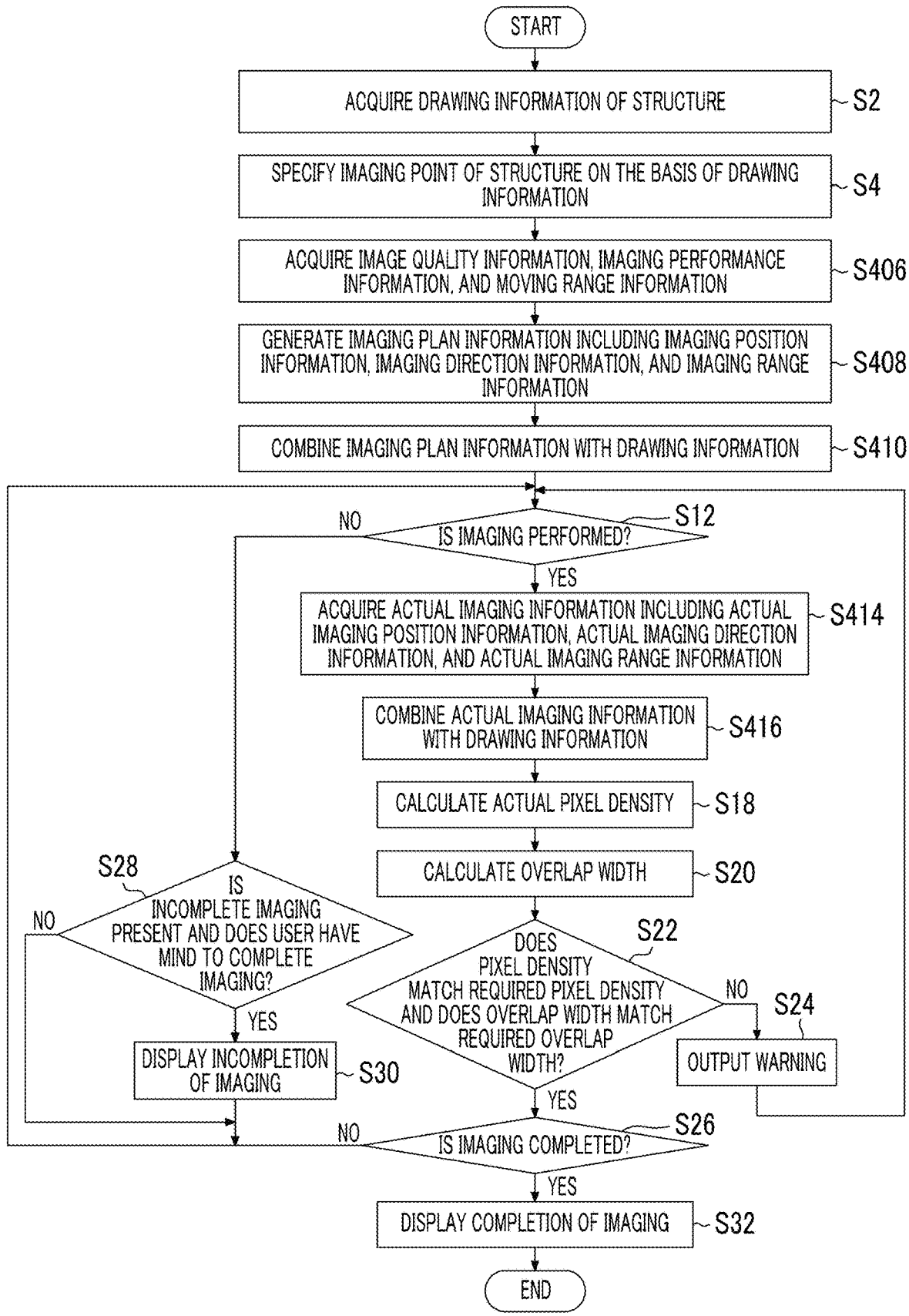
FIG. 14 is a flowchart showing the flow of Example of imaging support processing of a second embodiment.

FIG. 14 is a flowchart showing the flow of an example of imaging support processing of a second embodiment. This processing is performed by the CPU 20 according to a program stored in the storage unit 16. The same steps as the steps of the first embodiment shown in the flowchart of FIG. 7 will be denoted by the same reference numerals as the reference numerals shown in the flowchart of FIG. 7 and the detailed description thereof will be omitted.

In this embodiment, after drawing information is acquired (Step S2) and an imaging point is specified (Step S4), image quality information, imaging performance information, and moving range information are acquired by the external input/output unit 12 (Step S406) and imaging plan information, which includes imaging position information of the imaging device 200 at each imaging, imaging direction information of the imaging device 200 at each imaging, and imaging range information of the structure at each imaging, is generated on the basis of the imaging point specified in Step S4 and the image quality information, the imaging performance information, and the moving range information acquired in Step S406 (Step S408).

Next, the imaging support information-generation unit 30 combines the imaging plan information (including the imaging position information, the imaging direction information, and the imaging range information) with the drawing information and allows the display unit 13 to display the combined information (Step S410). On the other hand, an aspect in which only the imaging range information is combined with the drawing information and both the imaging position information and the imaging direction information are not combined with the drawing information may be made, and an aspect in which any one of the imaging position information and the imaging direction information is combined with the drawing information together with the imaging range information may be made. Further, an aspect in which only the imaging position information is combined with the drawing information and both the imaging direction information and the imaging range information are not combined with the drawing information may be made, and an aspect in which any one of the imaging direction information and the imaging range information is combined with the drawing information together with the imaging position information may be made.

Next, the actual imaging position information, the actual imaging direction information, and the actual imaging range information of the imaging device 200 are acquired whenever imaging is performed (that is, if the result of the determination in Step S12 is "YES") (Step S414); and the actual imaging position information, the actual imaging direction information, and the actual imaging range information of the imaging device 200 at each imaging are combined with the drawing information to generate imaging support information and the display unit 13 is allowed to display the imaging support information (Step S416). On the other hand, an aspect in which only the actual imaging range information is combined with the drawing information and both the actual imaging position information and the actual imaging direction information are not combined with the drawing information may be made, and an aspect in which any one of the actual imaging position information and the actual imaging direction information is combined with the drawing information together with the actual imaging range information may be made. Further, an aspect in which only the actual imaging position information is combined with the drawing information and both the actual imaging direction information and the actual imaging range information are not combined with the drawing information may be made, and an aspect in which any one of the actual imaging direction information and the actual imaging range information is combined with the drawing information together with the actual imaging position information may be made.

Third Embodiment

Imaging support processing for one type of member (any one of the concrete member and the steel member) has been described in the first and second embodiments. However, since a structure to be inspected generally includes plural types of members, there is a case where an imaging point varies for each type of member. Further, since the type of damage to a member varies depending on the type of a member, there is a case where an imaging point varies for each type of damage to be generated. Furthermore, there is a case where an imaging point varies depending on the type of the configuration of a structure.

An imaging point specification unit 22 of this embodiment analyzes drawing information and specifies an imaging point on the basis of imaging point-related information that is acquired from the database 50 by the external input/output unit 12 (including at least one of information representing the type of a member of a structure, information representing the type of damage to the structure, or information representing the type of the configuration of the structure). For example, in a case in which the type of the member of the structure is a concrete member, the entire exposed surface of the concrete member is specified as the imaging point. Further, for example, in a case in which the type of the member of the structure is a steel member, a portion of the steel member to which stress is applied is specified as the imaging point.

Figure 15:
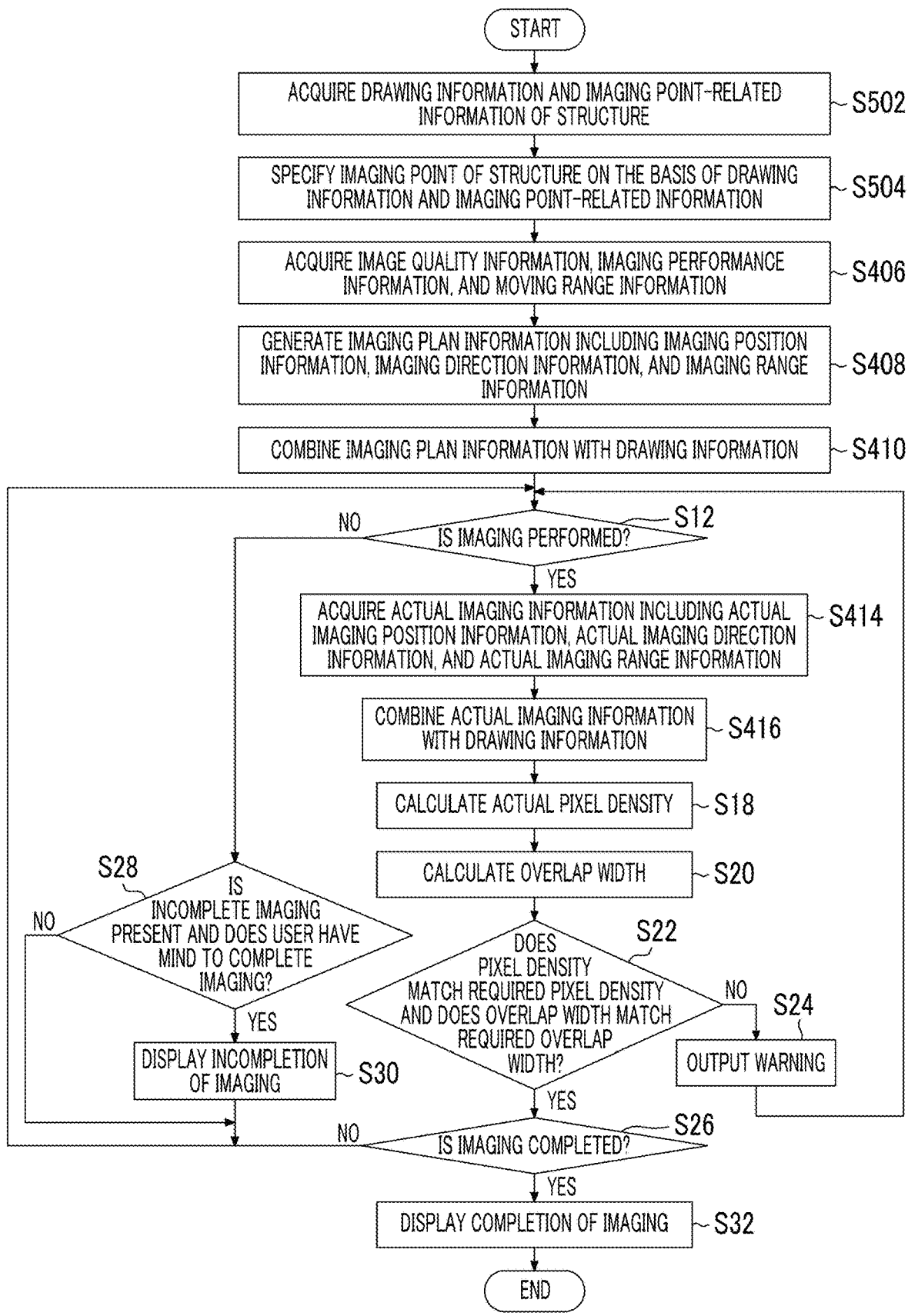
FIG. 15 is a flowchart showing the flow of Example of imaging support processing of a third embodiment.

FIG. 15 is a flowchart showing the flow of an example of imaging support processing of a third embodiment. This processing is performed by the CPU 20 according to a program stored in the storage unit 16. The same steps as the steps of the second embodiment shown in the flowchart of FIG. 14 will be denoted by the same reference numerals as the reference numerals shown in the flowchart of FIG. 14 and the detailed description thereof will be omitted.

In Step S502, drawing information and imaging point-related information of a structure are acquired from the database 50 by the external input/output unit 12. Here, the imaging point-related information includes at least one of member type information that represents the type of a member, damage type information that represents the type of damage, or structure type information that represents the type of the configuration of a structure.

In Step S504, the imaging point specification unit 22 specifies an imaging point of the structure on the basis of the drawing information and the imaging point-related information.

An example of the specification of imaging points of steel members of a bridge 1 will be described below.

Figure 16:
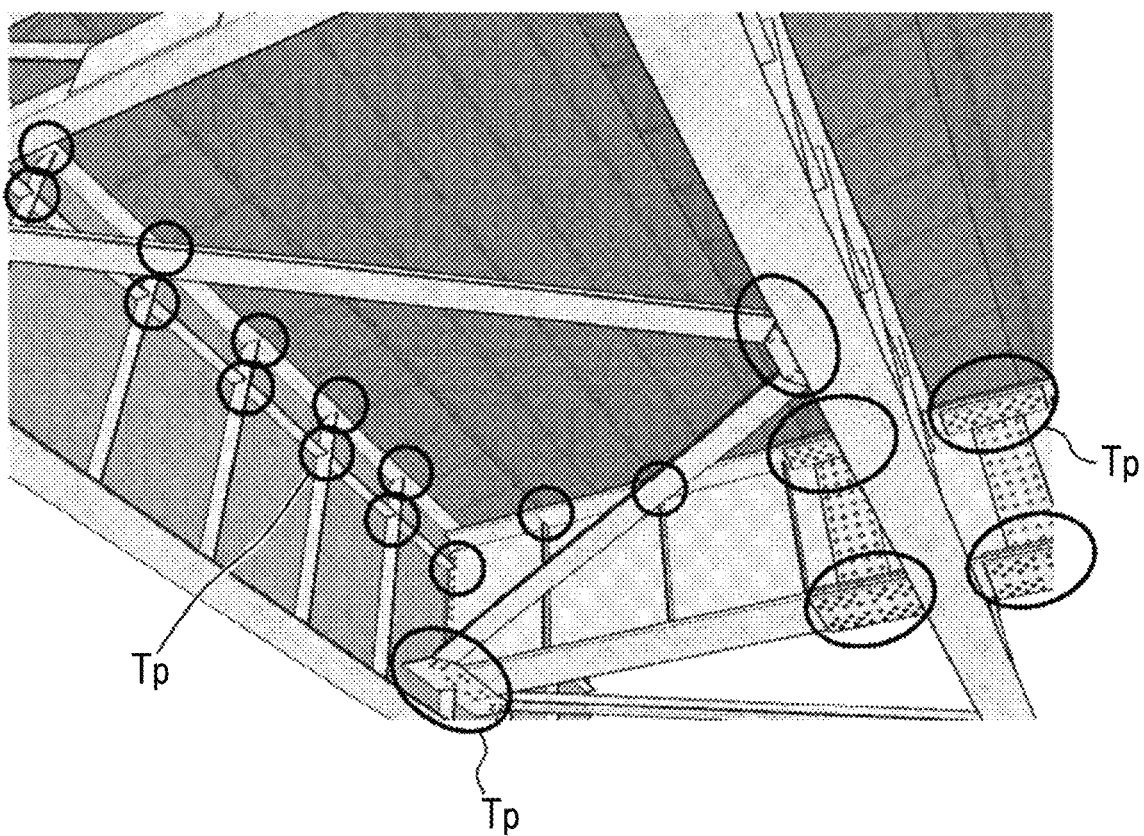
FIG. 16 is a diagram schematically showing imaging points of steel members of the bridge.

FIG. 16 is a diagram schematically showing imaging points Tp of steel members of the bridge 1. Circles in FIG. 16 are marks that surround imaging points Tp for convenience for the description of this embodiment, and may not be displayed on the display unit 13. Further, as shown in FIG. 16, the marks may be combined with drawing information to allow the display unit 13 to display the marks so that a user easily grasps the imaging points.

Figure 17:
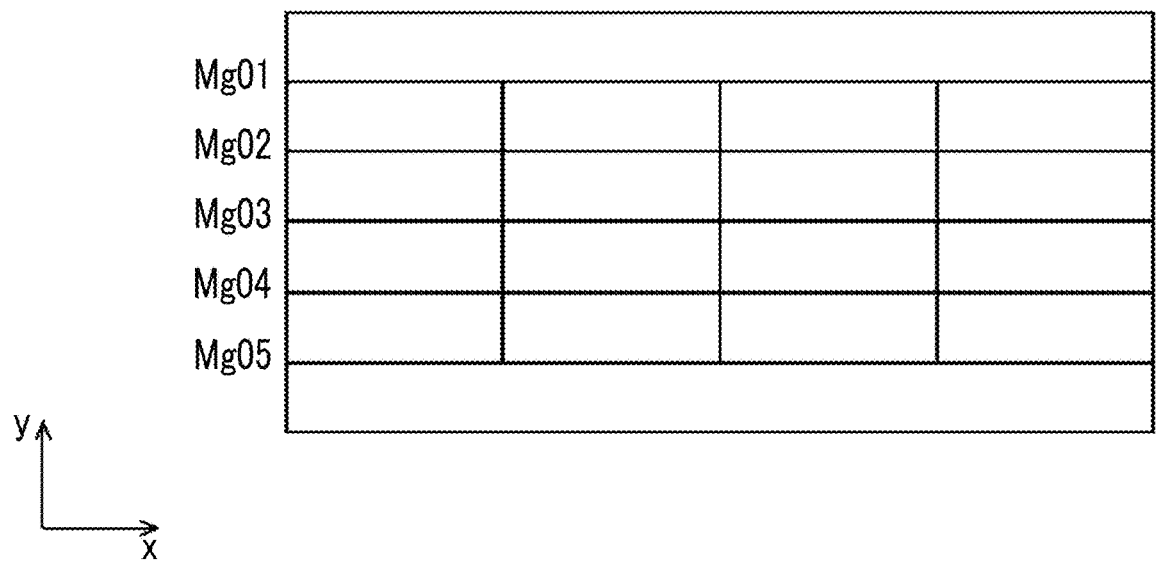
FIG. 17 is a diagram showing member numbers of main girders of the bridge.

FIG. 17 is a diagram showing member numbers Mg of main girders 2 of the bridge 1. As shown in FIG. 17, the member numbers of the main girders (Mg) are expressed by Mg01, Mg02, Mg03, Mg04, and Mg05. That is, it is understood that the bridge includes five main girders (Mg) denoted by Mg01 to Mg05.

Members of the bridge 1 include the main girders 2, the cross beams 3, the cross frames 4, the lateral frames 5, the deck slabs 6, and the like as shown in FIG. 1, but the types of the respective members are represented by member symbols corresponding to member names (the main girders (Mg), the cross beams (Cr), the cross frames (Cf), the lateral frames (an upper lateral frame (Lu) and a lower lateral frame (Ll)), the deck slabs (Ds), and the like).

Figure 18:
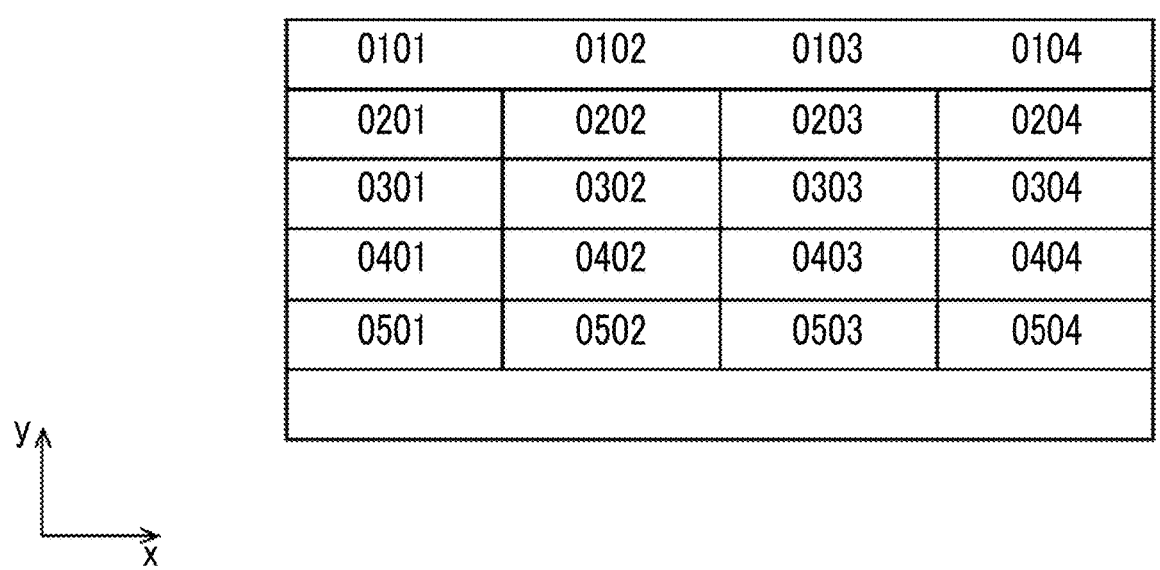
FIG. 18 is a diagram showing element numbers of main girders of the bridge.

FIG. 18 is a diagram showing element numbers of main girders of the bridge. As shown in FIG. 18, an element number expressed by a four-digit number is the number of the minimum evaluation unit of each portion or each member to be inspected and evaluated. Upper two digits of the four-digit number of the element number represent the line (row) in the longitudinal direction of the bridge, and lower two digits thereof represent the line (column) in a direction orthogonal to the longitudinal direction of the bridge.

Accordingly, a member to be inspected can be uniquely specified by the combination of a member symbol, which represents the type of the member, and an element number, and the combination of the member symbol and the element number corresponds to member identification information.

Figure 19:
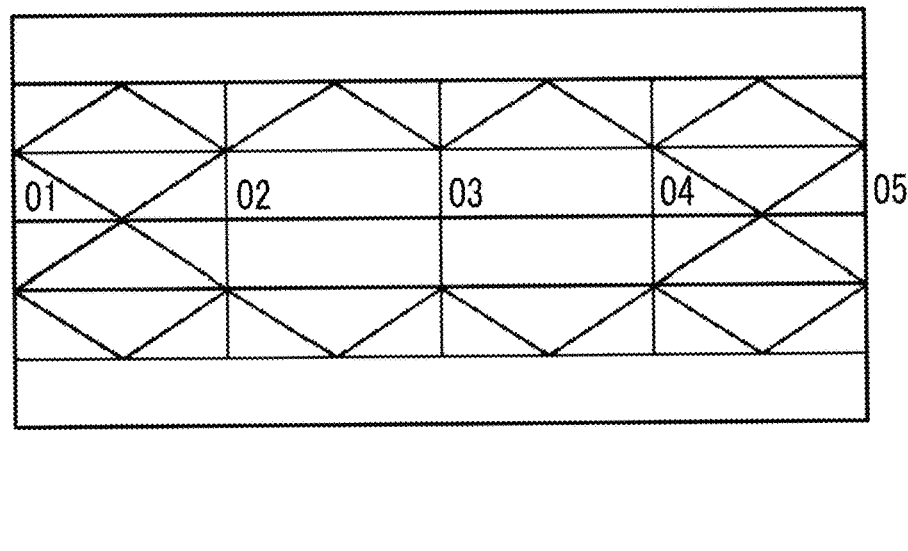
FIG. 19 is a diagram showing member numbers of cross beams of the bridge.
Figure 20:
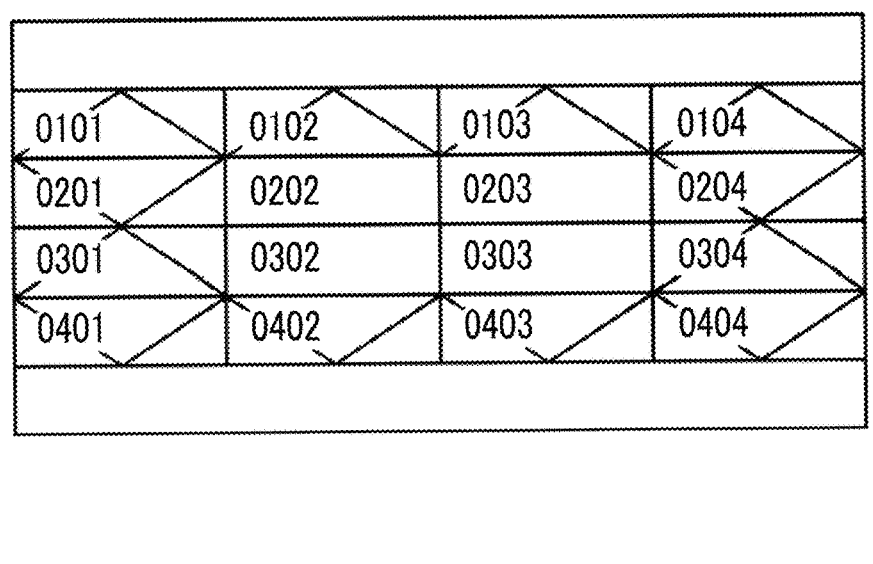
FIG. 20 is a diagram showing element numbers of cross beams of the bridge.

Likewise, FIG. 19 is a diagram showing the member numbers of the cross beams (Cr) of the bridge, and FIG. 20 is a diagram showing the element numbers of the cross beams (Cr) of the bridge.

Figure 21:
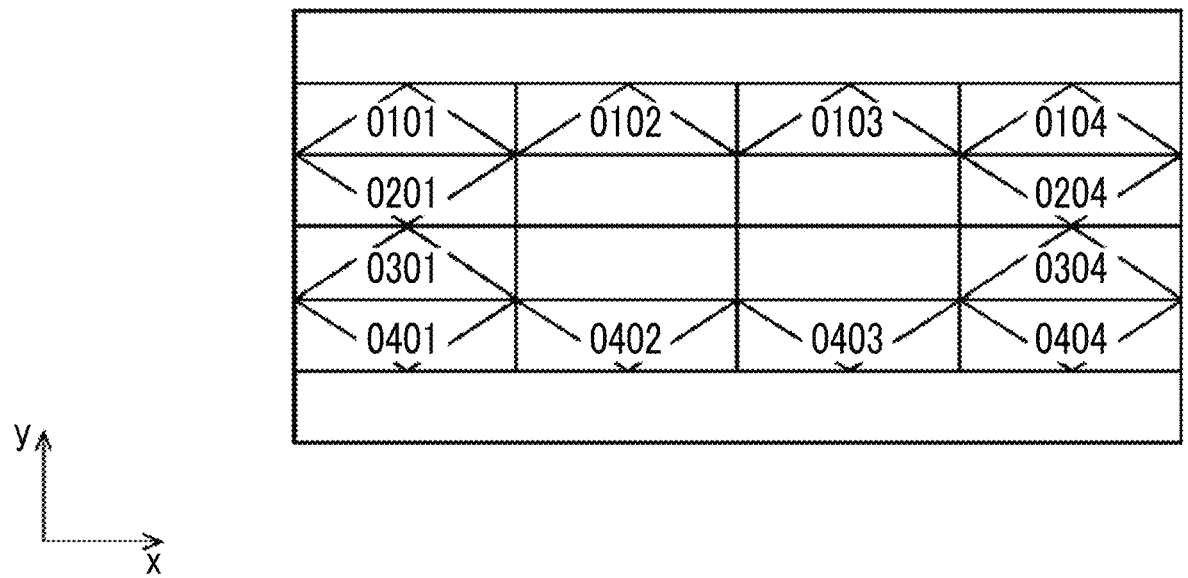
FIG. 21 is a diagram showing element numbers of a lower lateral frame of the bridge.
Figure 22:
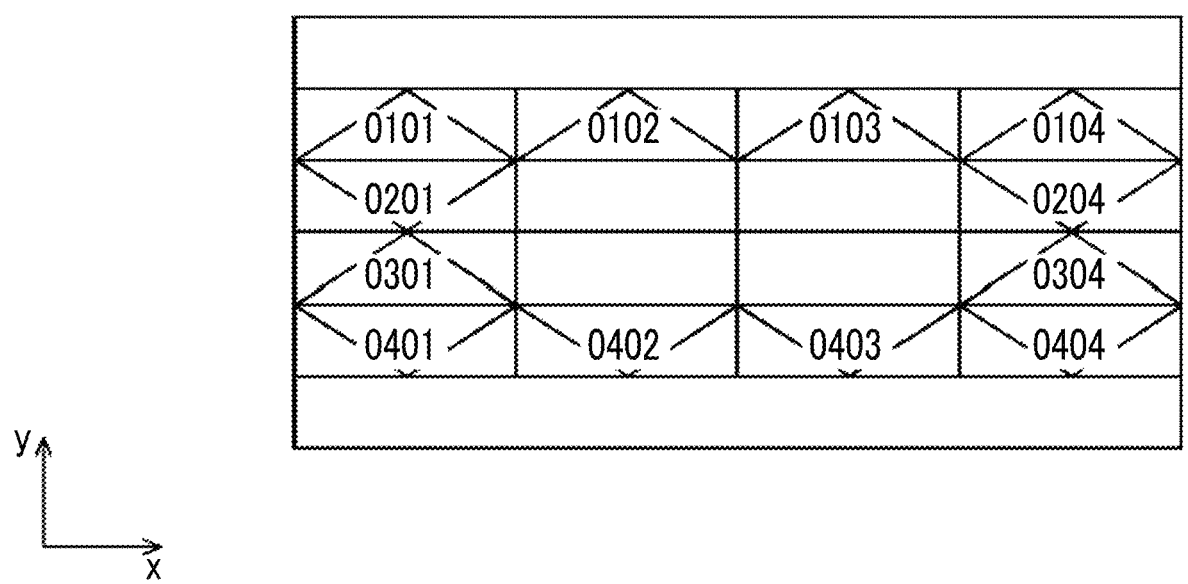
FIG. 22 is a diagram showing element numbers of an upper lateral frame of the bridge.

Further, FIG. 21 is a diagram showing the element numbers of the lower lateral frame (Ll) of the bridge, and FIG. 22 is a diagram showing the element numbers of the upper lateral frame (Lu) of the bridge.

The imaging point specification unit 22 specifies joint portions, to which stress is applied, of the main girders (Mg), the cross beams (Cr), the cross frames (Cf), and the lateral frames (the upper lateral frame (Lu) and the lower lateral frame (Ll)), which are steel members and shown in FIGS. 17 to 22, as imaging points.

[Variation of Imaging Plan Information and Actual Imaging Information]

A case in which the imaging plan information includes the imaging position information and the imaging range information and the actual imaging information includes the actual imaging position information and the actual imaging range information has been described in the above-mentioned embodiments (first to third embodiments), but the invention is not particularly limited to the case. A case in which the imaging plan information includes the imaging position information and does not include the imaging range information is also included in the invention. Further, a case in which the actual imaging information includes the actual imaging position information and does not include the actual imaging range information is also included in the invention. Furthermore, a case in which the imaging plan information does not include the imaging position information and includes the imaging range information is also included in the invention. Moreover, a case in which the actual imaging information does not include the actual imaging position information and includes the actual imaging range information is also included in the invention.

[Variation of Combination]

Combinations of the drawing information of the structure have various variations.

A case in which the frame showing the current imaging range of the imaging device 200 as the actual imaging range information is combined with the drawing information as shown in FIG. 9 has been described in the above-mentioned examples of imaging support processing, but the invention is not limited to the case.

Figure 23:
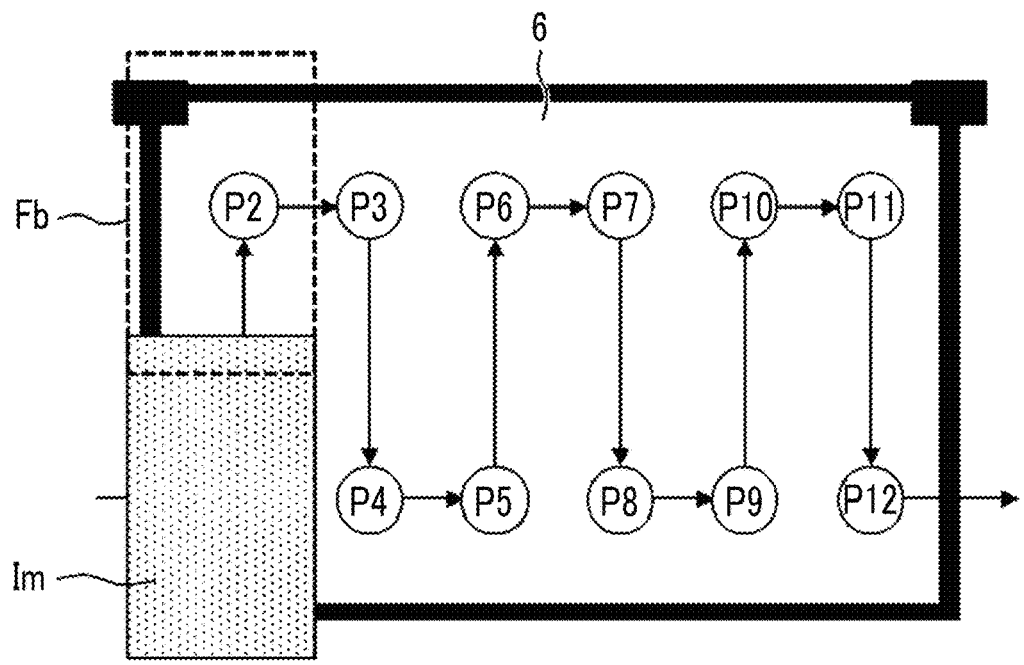
FIG. 23 is a diagram showing an example of display in a case in which the current taken image of the imaging device as actual imaging range information is combined with drawing information.

FIG. 23 shows an example of display in which a taken image Im (which is an image taken by the imaging device 200) as the actual imaging range information is combined with the drawing information. The taken image Im is not limited to the image of an object to be recorded, and may be an image that is not recorded (for example, live-view image).

Further, a case in which the imaging position information of the imaging plan information (which is information representing a scheduled imaging position of the imaging device 200) is combined with the drawing information as shown in FIG. 9 and the actual imaging position information (which is information representing the current imaging position of the imaging device 200) is not combined with the drawing information has been described in the above-mentioned examples of imaging support processing, but the invention is not limited to the case.

Figure 24:
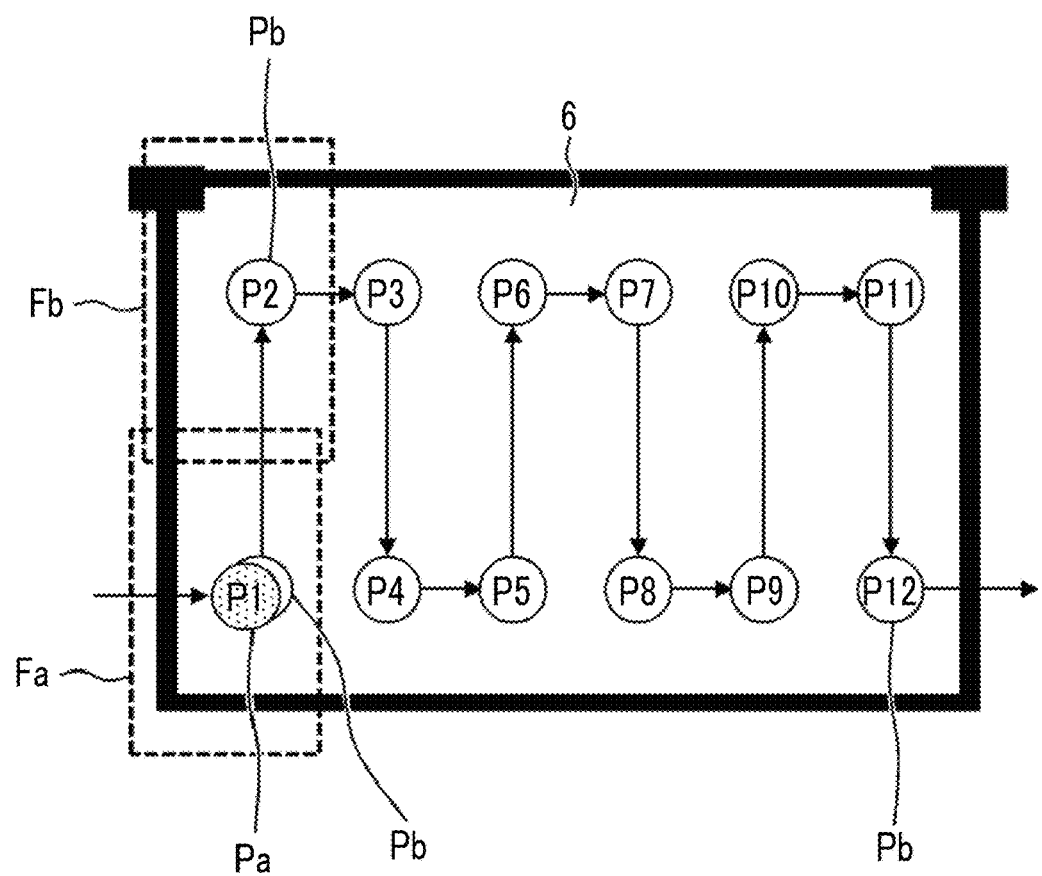
FIG. 24 is a diagram showing an example of display in which imaging position information of imaging plan information and actual imaging position information are combined with drawing information.

FIG. 24 shows an example of display in which the imaging position information Pb of the imaging plan information and the actual imaging position information Pa are combined with the drawing information. That is, imaging support information, which simultaneously represents the imaging position information Pb of the imaging plan information and the actual imaging position information Pa, is generated by the imaging support information-generation unit 30. The drawing information, the imaging position information Pb of the imaging plan and the actual imaging position information Pa are simultaneously displayed on the display unit 13.

[Variation of Acquisition of Actual Imaging Position Information]

An aspect in which the actual imaging position information of the imaging device 200 is acquired through communication with the reference device 300 (for example, total station) of which the absolute position is known has been described in the above-mentioned examples of imaging support processing, but the invention is not limited to the aspect.

There are various types of variations of the acquisition of the actual imaging position information.

As a first variation, there is an aspect where the actual imaging position information is acquired through communication with an apparatus (for example, the robot apparatus 100 of FIG. 2) on which the imaging device 200 is mounted. The actual imaging information-acquisition unit 28 acquires the absolute position of the imaging device 200 at one point of time from the robot apparatus 100 through the radio communication unit 11, acquires the relative position of the imaging device 200 at another point of time relative to the absolute position of the imaging device 200 at one point of time from the robot apparatus 100 through the radio communication unit 11, and acquires the actual imaging position information representing the absolute position of the imaging device 200 at another point of time on the basis of the absolute position of the imaging device 200 at one point of time and the relative position of the imaging device 200 at another point of time.

Since the coordinate system (drawing coordinate system) of the drawing information of the structure is different from the coordinate system (spatial coordinate system) of a space in which a structure is present, the drawing coordinate system and the spatial coordinate system need to be made to correspond to each other by the imaging support device 10 or the robot apparatus 100. However, the drawing coordinate system and the spatial coordinate system can be easily made to correspond to each other using the imaging position information of the imaging plan information. The reason for this is that the imaging position information of the imaging plan information is expressed by the drawing coordinate system or corresponds to the drawing coordinate system since the imaging position information of the imaging plan information is the position information obtained on the basis of the drawing information. Accordingly, the actual imaging information-acquisition unit 28 also can obtain the actual imaging position information according to the following procedure.

First, the actual imaging information-acquisition unit 28 acquires a piece of imaging position information (for example, the position of P1 of FIG. 9) of the imaging plan information as "the absolute position at one point of time" of the imaging device 200, and controls the robot apparatus 100 through the radio communication unit 11 to move the imaging device 200 to a position, which corresponds to the piece of imaging position information of the imaging plan information, in the spatial coordinate system. Then, the actual imaging information-acquisition unit 28 acquires the moving direction and the moving distance of the imaging device 200 from the robot apparatus 100 through the radio communication unit 11, as "the relative position at another point of time". On the other hand, in a case in which the moving direction of the imaging device 200 is determined in advance, the actual imaging information-acquisition unit 28 may be adapted to acquire only the moving distance from the robot apparatus 100. After that, the actual imaging information-acquisition unit 28 calculates actual imaging position information (for example, the position of P2 of FIG. 9), which is "the absolute position at another point of time" on the basis of the piece of imaging position information of the imaging plan information, which represents "the absolute position at one point of time", and the moving direction and the moving distance of the imaging device 200 that represent "the relative position at another point of time". Since the actual imaging information-acquisition unit 28 acquires the actual imaging position information, the actual imaging information-acquisition unit 28 can easily acquire the actual imaging position information while making the drawing coordinate system and the spatial coordinate system correspond to each other.

A case in which the actual imaging position information is acquired through communication with the robot apparatus 100 has been described, but the actual imaging position information may be acquired through communication with other apparatuses. For example, in a case in which the imaging device is mounted on a drone (flying device), the actual imaging position information is acquired through communication with the drone.

In addition, it is considered that the imaging device 200 detects the absolute position by a global positioning system (GPS) function, the robot apparatus 100 detects the relative position from the absolute position, and the actual imaging position information is acquired on the basis of the absolute position detected by the imaging device 200 and the relative position detected by the robot apparatus 100. That is, there is a possibility that the actual imaging position information cannot be acquired by only the GPS function of the imaging device 200 at a position where GPS radio waves do not reach. However, the absolute position (reference position) may be acquired by the GPS function of the imaging device 200 at a position where GPS radio waves reach, and the relative position corresponding to the absolute position may be acquired at a position where GPS radio waves do not reach.

As a second variation, there is an aspect where the imaging device 200 detects the actual imaging position information and the actual imaging position information is acquired through communication with the imaging device 200.

For example, a radio frequency identification (RFID) medium in which position information is recorded is provided at an imaging point of the structure in advance, the imaging device 200 reads the position information from the RFID medium at the time of imaging of the imaging point of the structure, and the imaging device 200 detects the actual imaging position information on the basis of the position information of the RFID medium. The actual imaging information-acquisition unit 28 acquires the actual imaging position information from the imaging device 200 through the radio communication unit 11. On the other hand, only identification (ID) information is recorded in the RFID medium and the actual imaging information-acquisition unit 28 may detect the actual imaging position information on the basis of the ID information.

The embodiments of the invention have been described above, but the invention is not limited to the above-mentioned embodiments and the above-mentioned modification examples and can have various modifications without departing from the scope of the invention.

EXPLANATION OF REFERENCES

1: bridge
2: main girder
3: cross beam
4: cross frame
5: lateral frame
6: deck slab
10: imaging support device
11: radio communication unit
12: external input/output unit
13: display unit
14: sound output unit
15: instruction input unit
16: storage unit
20: CPU
22: imaging point specification unit
24: imaging planning unit
26: imaging control unit
28: actual imaging information-acquisition unit
30: imaging support information-generation unit
32: image quality-determination unit
34: imaging range-determination unit
36: imaging completion-determination unit
38: imaging incompletion-determination unit
50: database
100: robot apparatus
102: main frame
104: vertical telescopic arm
104A: camera installation part
106: housing
108: X-direction drive unit
108A: ball screw
108B: ball nut
108C: motor
110: Y-direction drive unit
110A: tire
110B: tire
112: Z-direction drive unit
120: pan/tilt mechanism
130: robot control unit
200: imaging device
204: imaging control unit
206: pan/tilt drive unit
210: pan/tilt control unit
230: robot-side communication unit
300: reference device
D: imaging direction
Dp: distance
Fa: actual imaging range frame (actual imaging range information)
Fb: imaging range frame (imaging range information)
Im: taken image
Mg: member number
Or: origin
P: pan axis
Pa: actual imaging position information
Pb: imaging position information
Pp: actual imaging position
Rf: requirement matching range
Sp: surface to be imaged
T: tilt axis
Tp: imaging point
φ: angle of view

What is claimed is:

1. An imaging support device that supports imaging of a structure performed using an imaging device, the imaging support device comprising:
a drawing information-acquisition circuit that acquires drawing information of the structure;
an imaging point specification circuit that specifies an imaging point of the structure on the basis of the drawing information; and
an image quality information-acquisition circuit that acquires image quality information of a taken image;
an imaging planning circuit that generates imaging plan information including at least one of imaging position information or imaging range information of the imaging device at each imaging of the structure on the basis of the specified imaging point and the image quality information;
an actual imaging information-acquisition circuit that acquires actual imaging information including at least one of actual imaging position information or actual imaging range information of the imaging device at each imaging of the structure; and
an imaging support information-generation circuit that combines the imaging plan information and the actual imaging information with the drawing information and allows a display device to display combined information.

2. The imaging support device according to claim 1, wherein the imaging device includes an imaging element and an imaging lens,
the imaging support device further comprises an imaging performance information-acquisition circuit that acquires imaging performance information including information on the number of pixels of the imaging element of the imaging device, size information of the imaging element of the imaging device, and information on a focal length of the imaging lens, and
the imaging planning circuit generates the imaging plan information, which satisfies image quality required for the taken image, on the basis of the imaging performance information and the image quality information.

3. The imaging support device according to claim 2, wherein the imaging performance information includes information on at least one of a contrast, a focus, a blur, a shake, an angle of view, noise, a compression rate, white balance, or a shutter speed.

4. The imaging support device according to claim 1,
wherein the imaging support information-generation circuit combines an image, which is taken by the imaging device, with the drawing information.

5. The imaging support device according to claim 1, further comprising:
an imaging range-determination circuit that determines whether or not the taken image and another taken image overlap each other by a certain width or more.

6. The imaging support device according to claim 5,
wherein the imaging range-determination circuit determines whether or not the taken image and another taken image overlap each other on the basis of the actual imaging range information of the taken image having been taken and the imaging range information of another taken image not yet taken.

7. The imaging support device according to claim 5,
wherein the imaging support information-generation circuit allows the display device to display a warning in a case in which the imaging range-determination circuit determines that the taken image and another taken image do not overlap each other by the certain width or more.

8. The imaging support device according to claim 1,
wherein the imaging support information-generation circuit allows the display device to display the imaging position information and the actual imaging position information at each imaging of the structure.

9. The imaging support device according to claim 1,
wherein the actual imaging information-acquisition circuit acquires the actual imaging position information through communication with a reference device of which an absolute position is known.

10. The imaging support device according to claim 1,
wherein the actual imaging information-acquisition circuit acquires an absolute position of the imaging device at one point of time, acquires a relative position of the imaging device at another point of time relative to the absolute position of the imaging device at one point of time, and acquires the actual imaging position information on the basis of the absolute position and the relative position of the imaging device.

11. The imaging support device according to claim 1, further comprising:
a moving range information-acquisition circuit that acquires moving range information representing a range where the imaging device is capable of being moved or a range where the imaging device is not capable of being moved,
wherein the imaging planning circuit generates the imaging plan information, which allows the imaging device to be moved in the range where the imaging device is capable of being moved, on the basis of the moving range information.

12. The imaging support device according to claim 11,
wherein the imaging planning circuit generates the imaging plan information that represents a permutation of imaging positions in the range where the imaging device is capable of being moved, and
the imaging support information-generation circuit allows the display device to display the permutation of the imaging positions.

13. The imaging support device according to claim 1,
wherein the imaging planning circuit acquires imaging direction information of the imaging device at each imaging of the structure, and generates the imaging plan information that includes the imaging direction information.

14. The imaging support device according to claim 1, further comprising:
an imaging completion-determination circuit that determines whether or not imaging of the imaging point is completed,
wherein the imaging support information-generation circuit allows the display device to display imaging completion information in a case in which it is determined that the imaging is completed.

15. The imaging support device according to claim 14,
wherein the imaging support information-generation circuit allows the display device to display imaging incompletion information in a case in which it is determined that incomplete imaging of the imaging point is present and a distance between the imaging position subjected to the incomplete imaging and the imaging device exceeds a threshold value.

16. The imaging support device according to claim 14, further comprising:
an instruction input circuit that receives an instruction to be input,
wherein the imaging support information-generation circuit allows the display device to display imaging incompletion information in a case in which it is determined that incomplete imaging of the imaging point is present and an instruction to stop at least one of the imaging device or the imaging support device is input.

17. The imaging support device according to claim 1, further comprising:
an imaging point-related information-acquisition circuit that acquires at least one of information representing the type of a member of the structure, information representing the type of damage to the structure, or information representing the type of a configuration of the structure,
wherein the imaging point specification circuit specifies the imaging point by analyzing the drawing information on the basis of at least one of the information representing the type of the member, the information representing the type of the damage, or the information representing the type of the configuration.

18. The imaging support device according to claim 17,
wherein in a case in which the type of the member is a concrete member, the imaging point specification circuit specifies the entire exposed surface of the concrete member as the imaging point.

19. The imaging support device according to claim 17,
wherein in a case in which the type of the member is a steel member, the imaging point specification circuit specifies a portion of the steel member to which stress is applied as the imaging point.

20. An imaging support method that supports imaging of a structure performed using an imaging device, the imaging support method comprising:
acquiring drawing information of the structure;
specifying an imaging point of the structure on the basis of the drawing information;
acquiring image quality information of a taken image;
generating imaging plan information, which includes at least one of imaging position information or imaging range information of the imaging device at each imaging of the structure, on the basis of the specified imaging point and the image quality information;

acquiring actual imaging information including at least one of actual imaging position information or actual imaging range information of the imaging device at each imaging of the structure; and combining the imaging plan information and the actual imaging information with the drawing information and generating imaging support information allowing a display device to display combined information.

* * * * *